United States Patent [19]

Mottur et al.

[11] Patent Number: 5,085,137
[45] Date of Patent: Feb. 4, 1992

[54] EQUIPMENT FOR THE PREPARATION OF POTATO CHIPS

[75] Inventors: George P. Mottur, Danville; Dennis L. Kishbaugh, Berwick; Hilbert J. Cope, Jr., Berwick; Edward W. Cooper, Wapwallopen, all of Pa.

[73] Assignee: Borden, Inc., Columbus, Ohio

[21] Appl. No.: 709,791

[22] Filed: Jun. 3, 1991

Related U.S. Application Data

[60] Continuation of Ser. No. 298,013, Feb. 7, 1989, abandoned, which is a division of Ser. No. 76,689, Jul. 22, 1987, Pat. No. 4,844,930.

[51] Int. Cl.⁵ .............................................. A47J 37/12
[52] U.S. Cl. .................................... 99/404; 99/330; 99/407; 99/409
[58] Field of Search ............... 99/330, 331, 403–407, 99/408, 409, 348, 443 R, 443 C; 426/438, 519, 637, 441

[56] References Cited

U.S. PATENT DOCUMENTS

| | | | |
|---|---|---|---|
| 1,401,945 | 12/1921 | Morris . | |
| 2,085,494 | 6/1937 | Ferry | 99/405 |
| 2,186,345 | 1/1940 | Reidenbach | 99/409 X |
| 2,231,114 | 2/1941 | Ferry | 99/404 X |
| 2,611,705 | 9/1952 | Hendel | 426/438 |
| 2,633,793 | 4/1953 | Wise, Sr. | 99/405 |
| 2,812,254 | 11/1957 | Smith, Jr. | 426/438 |
| 2,934,001 | 4/1960 | Cunningham et al. | 99/406 |
| 3,149,978 | 9/1964 | Anderson et al. | 99/404 X |
| 3,223,024 | 12/1965 | Benson et al. | 99/404 X |
| 3,244,538 | 4/1966 | Kaehler | 426/438 |
| 3,282,197 | 11/1966 | Smith, Jr. | 99/405 |
| 3,309,981 | 3/1967 | Benson et al. | 99/407 X |
| 3,446,138 | 5/1969 | Hasten et al. | 99/404 |
| 3,472,155 | 10/1969 | Caridis et al. | 99/404 |
| 3,641,924 | 2/1972 | Sijbring | 99/406 |
| 3,696,735 | 10/1972 | Boertje et al. . | |
| 3,708,311 | 1/1973 | Bolton et al. | 99/406 X |
| 3,754,468 | 8/1973 | Wright et al. | 99/403 |
| 3,787,594 | 1/1974 | Palmason | 426/438 |
| 3,794,745 | 2/1974 | Boertje et al. . | |
| 3,885,056 | 5/1975 | Smith et al. | 99/404 X |
| 3,934,046 | 1/1976 | Weaver et al. . | |
| 4,020,189 | 4/1977 | Wright et al. | 99/405 X |
| 4,234,612 | 11/1980 | Sakakibara et al. | 99/404 X |
| 4,366,749 | 1/1983 | Caridis et al. | 99/339 |
| 4,392,420 | 7/1983 | Caridis et al. . | |
| 4,488,478 | 12/1984 | Leeper | 99/404 X |
| 4,491,602 | 1/1985 | Miller | 99/408 X |
| 4,503,127 | 3/1985 | Fan et al. . | |
| 4,537,786 | 8/1985 | Bernard | 426/438 |
| 4,694,743 | 9/1987 | Groff | 99/403 X |
| 4,706,556 | 11/1987 | Wallace et al. . | |
| 4,738,193 | 4/1988 | Benson et al. . | |
| 4,741,912 | 5/1988 | Katz et al. | 426/438 |

FOREIGN PATENT DOCUMENTS

| | | |
|---|---|---|
| 0065791 | 12/1982 | European Pat. Off. . |
| 0065791 | 12/1982 | European Pat. Off. . |
| 0206029 | 3/1988 | European Pat. Off. . |
| 2247122 | 3/1974 | Fed. Rep. of Germany . |
| 2170396 | 8/1986 | United Kingdom . |

OTHER PUBLICATIONS

"MacBeth Introducing New Fryer", Chipper/Snacker, Jun. 1987 p. 64.

*Primary Examiner*—Timothy F. Simone
*Attorney, Agent, or Firm*—Venable, Baetjer, Howard & Civiletti

[57] ABSTRACT

A low temperature continuous frying process is used to make potato chips which are similar in taste and texture to those produced by the slow-cooked batch or kettle process. Potato slices are conveyed through first, second and third frying zones in a heated liquid frying medium, and the frying medium is admitted separately into each zone at a rate and temperature such that the potato slices are exposed first to a decrease and then to an increase in the temperature of the frying medium over time. The potato slices take on a pliable and shape-holding consistency as they are conveyed through the second frying zone, and folded potato chips may be obtained by agitating and compacting the potato slices as they are conveyed through this zone. The agitation and compaction may be carried out by rotating paddle assemblies arranged longitudinally in the frying vessel. Each paddle assembly comprises a rotatable shaft to which a number of vanes are affixed in a helical pattern.

24 Claims, 13 Drawing Sheets

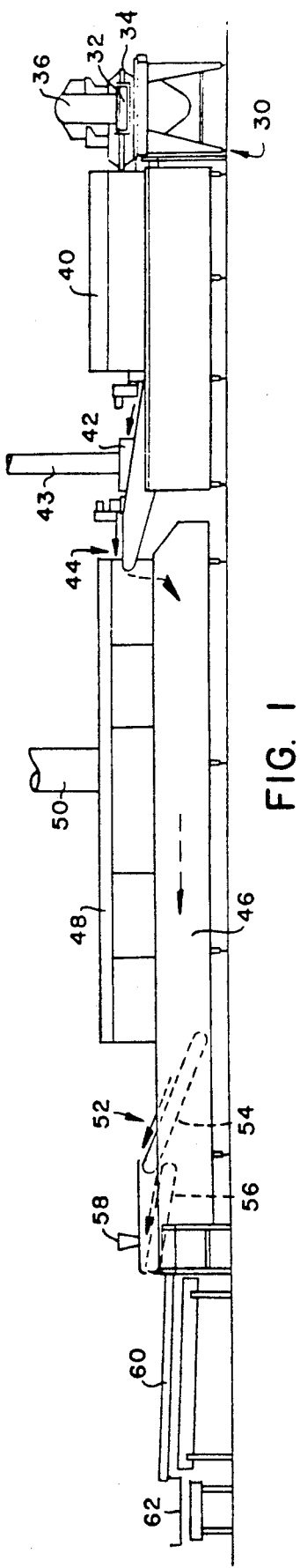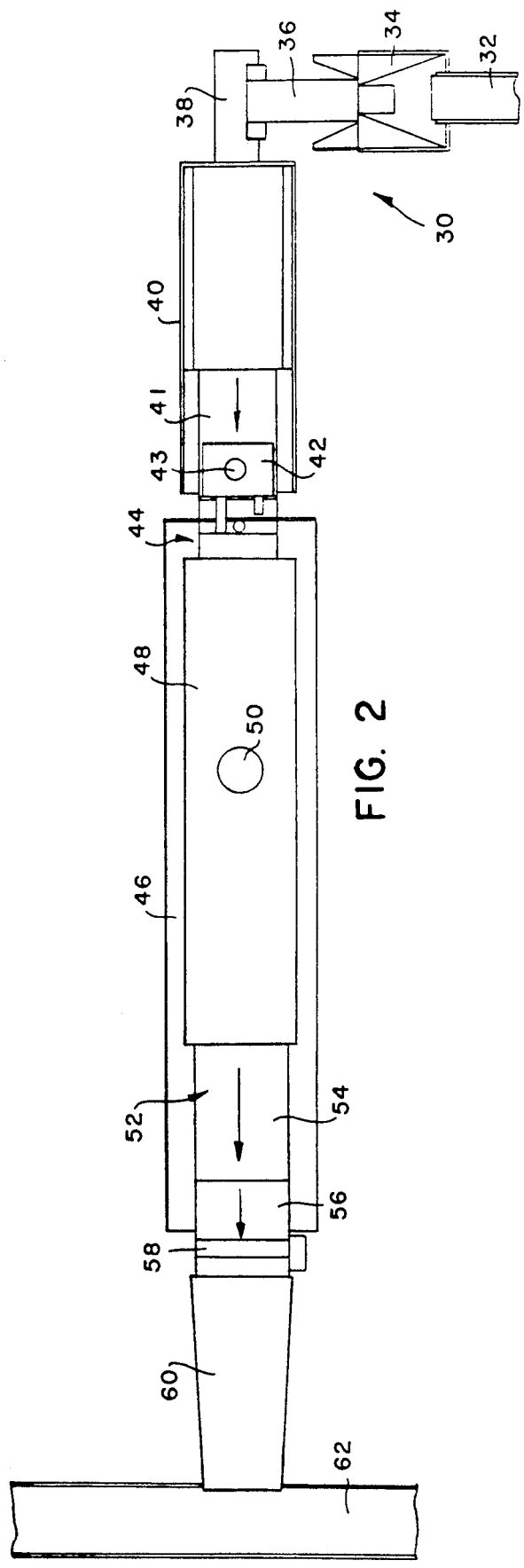

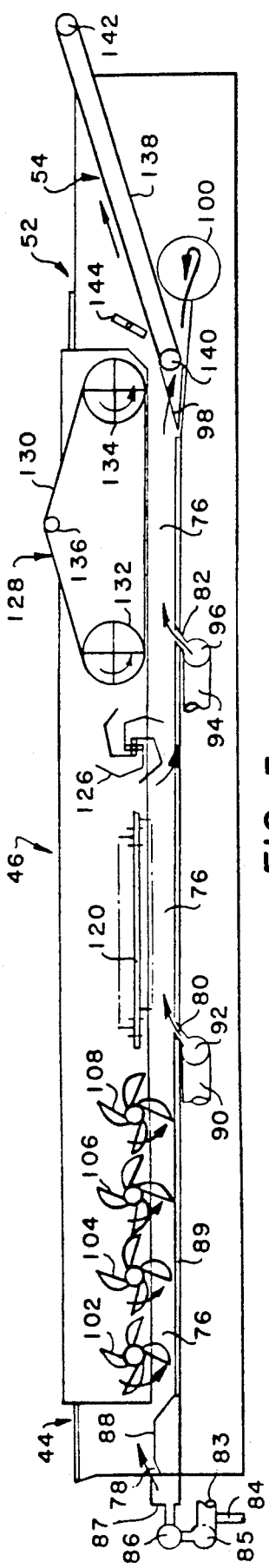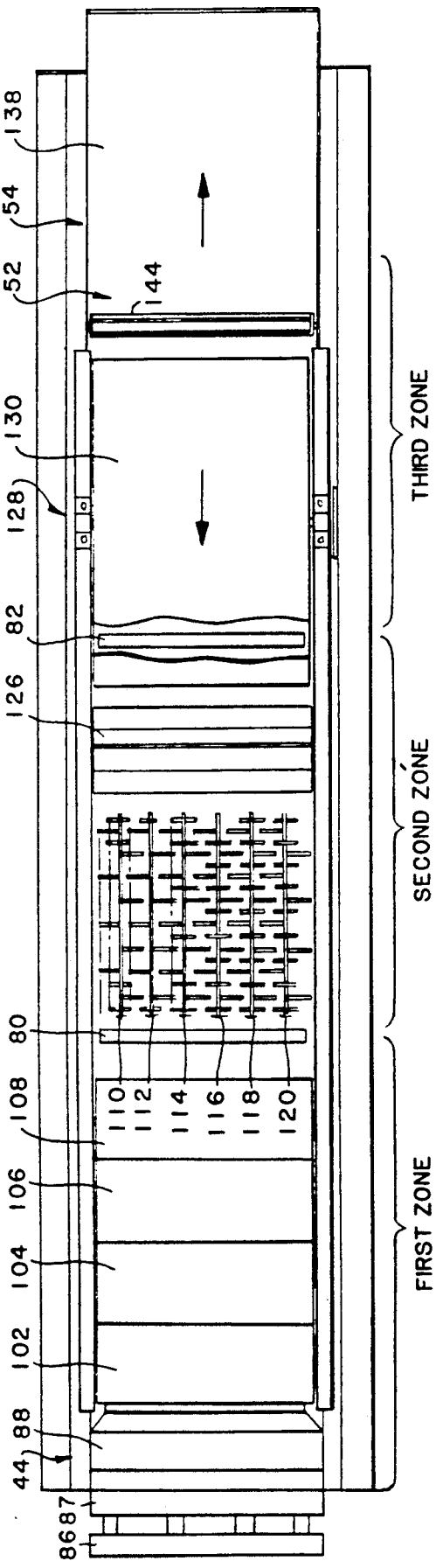
FIG. 3
FIG. 4

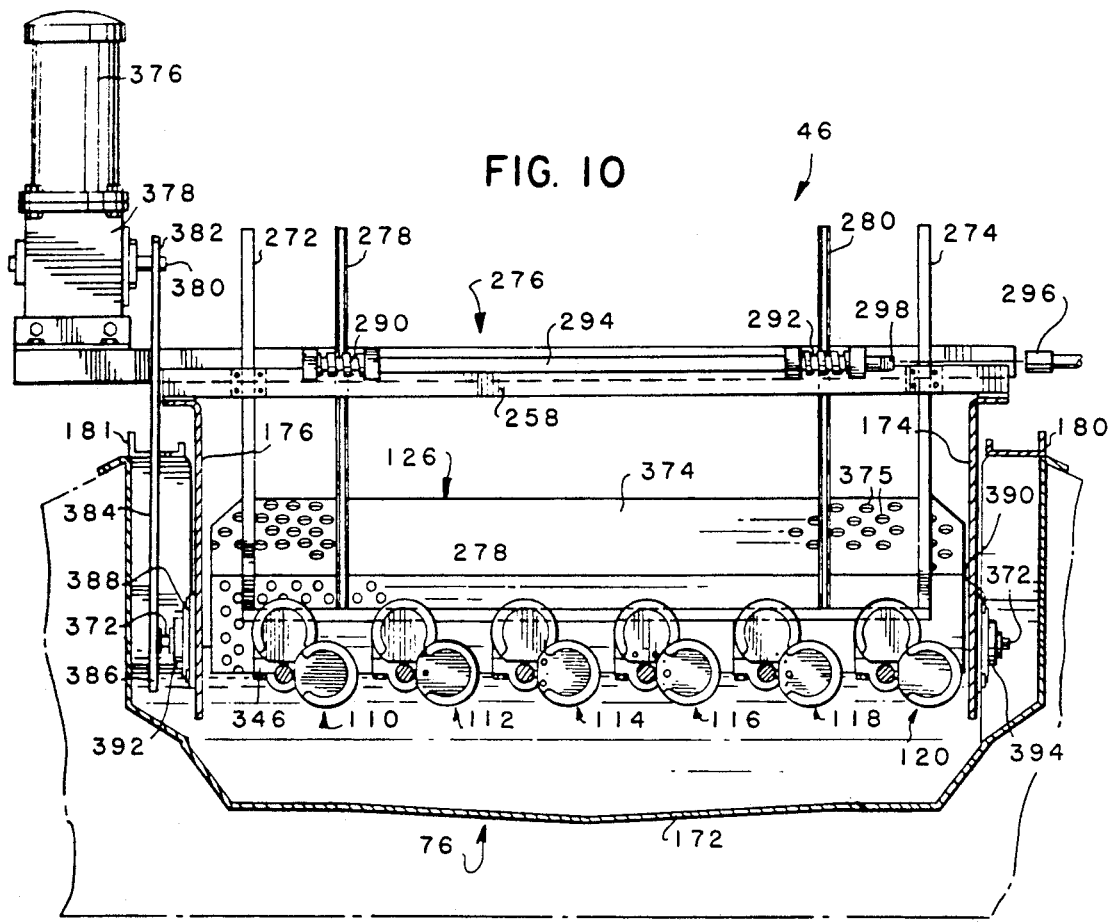
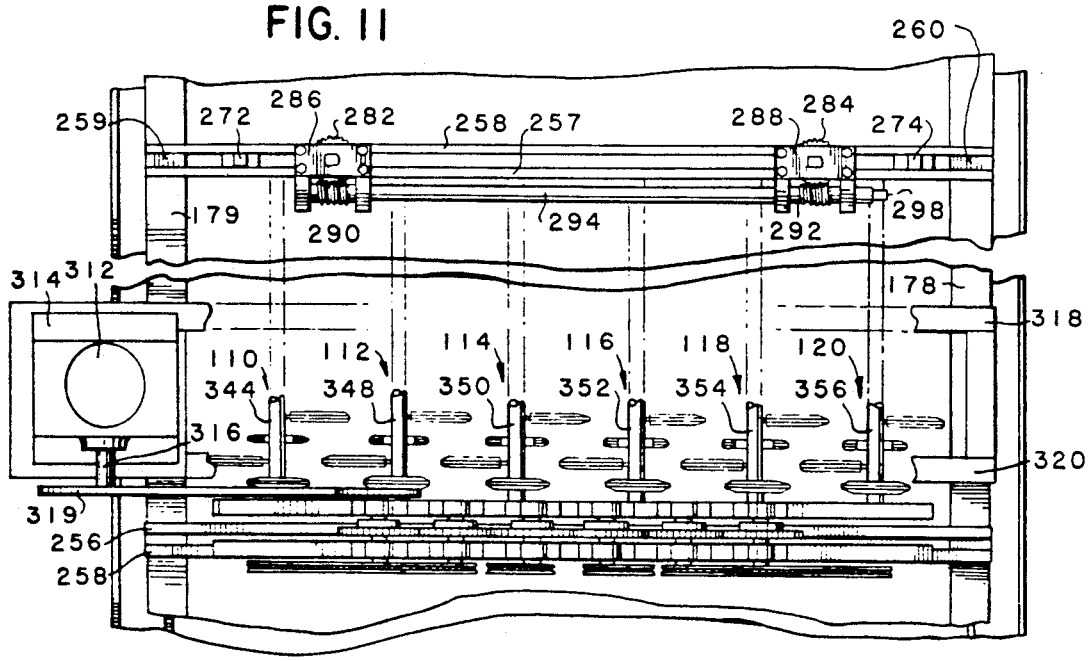

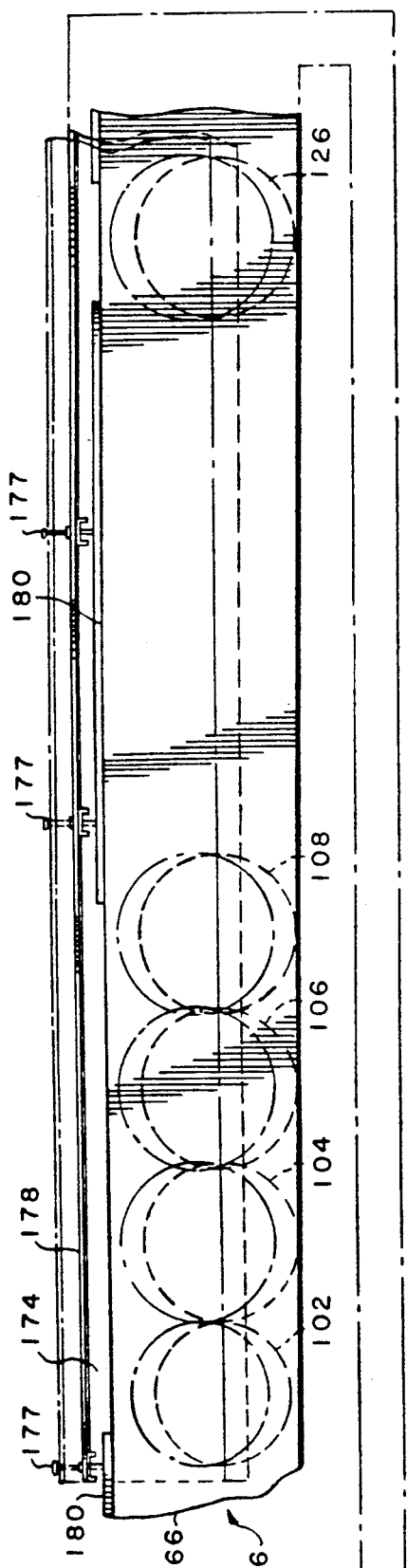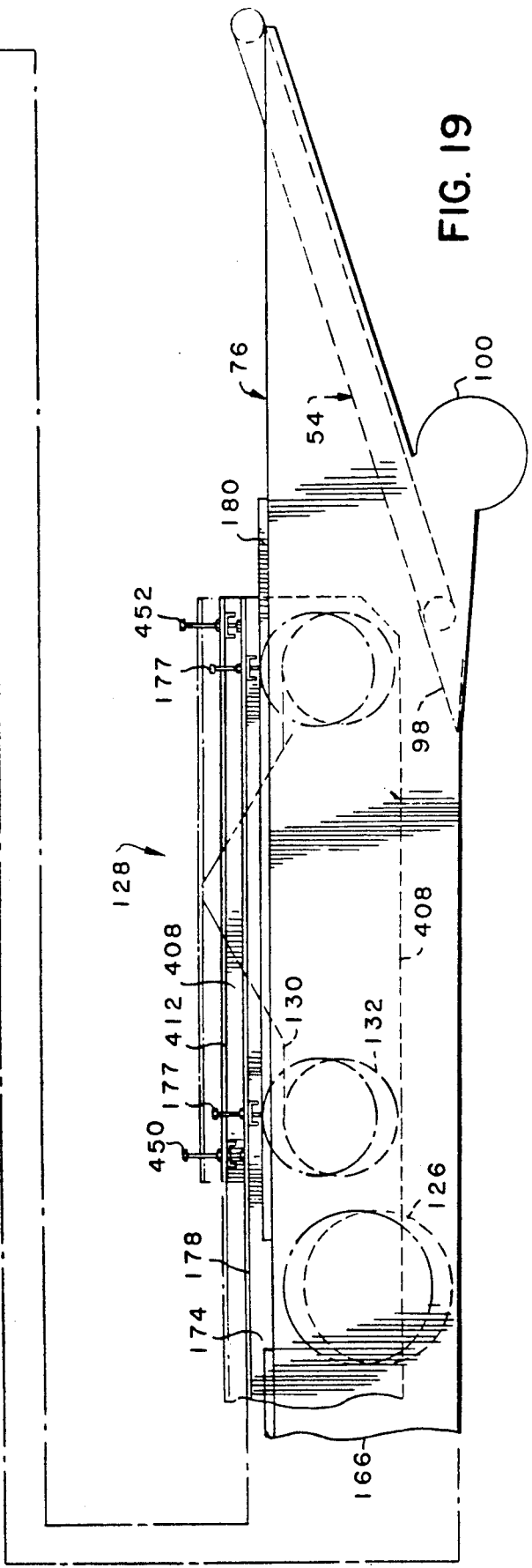
FIG. 19

EQUIPMENT FOR THE PREPARATION OF POTATO CHIPS

This application is a continuation of application Ser. No. 289,013, filed Feb. 7, 1989, now abandoned, which is a division of Ser. No. 07/076,689, filed July 22, 1987, now U.S. Pat. No. 4,844,930.

BACKGROUND OF THE INVENTION

The present invention relates generally to the production of potato chips and other food products prepared by deep-fat frying, and is particularly concerned with a continuous frying method and apparatus for making potato chips which are similar in taste and texture to those produced by the slow-cooked batch or kettle process.

Large scale commercial production of potato chips is usually carried out in a continuous frying apparatus at temperatures between 300° and 360° F. If frying is carried out below about 290° F., a distinctly different chip results. The chip produced by the lower temperature process is harder and crunchier, and its surface takes on a more bubbly appearance. In addition, the flavor is somewhat blander than that of a regular potato chip, and there is a more pronounced oiliness to the mouth feel. These characteristics are deemed very desirable by many producers and consumers of potato chips. Since the original method of making this type of chip was by the batch, in relatively small vessels of oil heated directly over a flame, the chips were termed "kettle style". Unfortunately, the batch process is very labor intensive and can produce only small quantities of finished product, typically between 50 and 125 pounds per hour per kettle. By contrast, large scale potato chip producers typically employ continuous fryers capable of producing on the order of 1,000 to 5,000 pounds per hour of finished product. The kettle or batch process is therefore uneconomical for large scale manufacturers.

For a number of reasons, it has not been possible to obtain the desirable qualities of kettle style potato chips in chips produced by conventional continuous fryers. In a typical continuous fryer, raw potato slices are introduced at one end of an elongated vessel or trough containing heated frying oil. While immersed in the oil, the potato slices are carried toward the opposite end of the vessel by mechanical conveying devices or more commonly by the velocity of the oil itself. Frying takes place as the water in the potato slices is driven out and replaced with oil, and the completely fried chips are removed when they reach the end of the vessel. In order to maximize the production rate and reduce sticking between the potato slices, high temperatures are utilized and the residence time of the slices in the frying oil can be held to a minimum. These conditions result in a chip with a taste and texture different from that of kettle style chips. Continuous fryers are also characterized by a temperature gradient in the oil bath which decreases continually from a maximum value at the entrance end of the fryer, where the oil is typically admitted after being heated by a heat exchanger or other type of heat source, and the exit end where the oil is withdrawn for reheating and recirculation. By contrast, the time-temperature profile in the kettle or batch process is more complex, initially decreasing as the relatively large amount of water in the raw potato slices absorbs heat from the oil and then increasing after most of the water has been vaporized and driven out. This is another factor which accounts for the differences between potato chips produced by the kettle process and those produced by continuous fryers.

When potato chips are made by the kettle or batch process, there is a tendency by producers to employ the maximum possible density of potato slices in the cooking oil in order to increase the output of what is inherently a very slow process. This increased density results in a high compaction of the potato slices during frying, with the consequence that many of the resulting chips are folded over or crumpled. This folding or crumpling provides a special crunchiness that many consumers find desirable. A second, less desirable result of the increased compaction is that some of the potato slices adhere to each other during the frying process, producing multiple connected potato chips. This phenomenon is undesirable not only because it detracts from the appearance of the final product, but also because the agglomeration of potato slices in the frying oil can lead to incomplete cooking.

Although it would be desirable to produce folded or crumpled potato chips using a continuous frying process, this has proved to be difficult since continuous fryers do not ordinarily achieve the necessary degree of compaction of chips in the frying oil. Although compaction can theoretically be increased by adding a greater quantity of potato slices to the frying oil per unit time, this is effective only to a limited extent. Beyond a certain point, an increase in the density of the potato slices will result in clustering and incomplete cooking of the slices unless sufficient agitation is employed to counteract the effects. Conventional continuous fryers are usually not capable of providing adequate agitation when the potato slices are compacted to the degree necessary to provide folded or compacted chips.

SUMMARY OF THE INVENTION

The present invention provides a method and apparatus for making kettle style potato chips in a continuous fryer. The potato chips produced in accordance with the present invention may be either folded or non-folded, although the ability to make folded chips in a continuous frying process is regarded as a particularly important advantage of the invention.

In one aspect, the invention is directed to a continuous method for making potato chips by conveying potato slices through a heated liquid frying medium, such as oil, maintained at a temperature below about 290° F. (143° C.). The first step of the method comprises conveying uncooked potato slices through a first frying zone for a time period sufficient to render the potato slices soft and limp. The soft and limp potato slices are next conveyed through a second frying zone for a time period sufficient to impart a pliable, shape-holding consistency to the potato slices. These pliable potato slices are next conveyed through a third frying zone for a period of time sufficient to produce rigid, completely fried chips, which are then removed from the liquid frying medium. The heated liquid frying medium is admitted separately into each of the first, second and third frying zones at a rate and temperature such that the potato slices are exposed first to a decrease and then to an increase in the temperature of the frying medium over time as the potato slices are conveyed through the first, second and third frying zones.

The provision of first, second and third frying zones at different temperatures in a continuous fryer is an important feature of the present invention. In conventional types of continuous fryers, the heated frying oil is admitted from a single inlet port located near the entrance end of the fryer, and hence the potato slices experience a descending temperature gradient as they are conveyed along the length of the fryer. In the kettle or batch process, however, the time-temperature profile is characterized by an initial drop in temperature as heat is used to vaporize the water in the uncooked potato slices, followed by an increase in temperature after most of the water has been vaporized and driven out. The present invention allows this unique temperature profile to be duplicated in a continuous frying process by admitting the heated frying oil at a number of different locations along the length of the fryer, so that the potato slices will encounter distinct temperature zones as they are conveyed through the fryer. Preferably, the frying oil is withdrawn from the fryer through an outlet located near its exit end, and is reheated by a heat exchanger prior to being reintroduced into the first, second and third frying zones. Some of the oil that is withdrawn from the vessel may be allowed to bypass the heat exchanger and to mix with the reheated oil that is introduced into the individual frying zones.

In accordance with a preferred embodiment of the present invention, folded kettle style potato chips are obtained by agitating and compacting the potato slices as they are conveyed through the second frying zone. Upon leaving the first frying zone, the potato slices have been cooked sufficiently so that they are soft and limp, but the frying has not proceeded to a point where the potato slices are rigid or stiff. By agitating and compacting the potato slices in the second frying zone, a certain proportion of the slices can be caused to assume a crumpled or folded shape. As the frying process proceeds in the second frying zone, the potato slices lose additional water and become pliable and shape-holding. Any slices that are folded or crumpled when this transition occurs will remain in that condition, and hence the final product will contain a certain proportion of folded or crumpled chips, preferably at least 30% by weight of the finished potato chips.

In another embodiment, the invention relates to a method for making potato chips by conveying potato slices through a heated liquid frying medium contained in an elongated vessel, wherein first, second and third frying zones of the elongated vessel are established by supplying heated liquid frying medium to the vessel from first, second and third inlet ports spaced along the length of the vessel. The temperature and flow rate of the heated liquid frying medium which is supplied through each of the inlet ports are controlled in a manner such that the second frying zone is maintained within a temperature range which is lower than the temperature ranges of the first and third frying zones.

The present invention is also directed to a continuous frying apparatus for making potato chips or other products prepared by deep-fat frying. The apparatus comprises an elongated vessel for containing a heated liquid frying medium, such as oil. The vessel has an entrance end for receiving uncooked potato slices for immersion in the frying medium, and an exit end from which the potato chips are removed after frying. The heated liquid frying medium is supplied to the vessel through a first inlet port located near the entrance end of the vessel, a second inlet port located downstream of the first inlet port, and a third inlet port located downstream of the first and second inlet ports. The first, second and third inlet ports define the start of first, second and third frying zones, respectively. Means are provided for conveying the potato slices sequentially through the first, second and third frying zones, and for compacting and agitating the potato slices in the second frying zone in order to cause at least some of the potato slices to assume a folded shape. The flow rate and temperature of the heated liquid frying medium supplied through each of the first, second and third inlet ports are controlled in a manner such that the temperatures of the first, second and third frying zones can be independently regulated.

In a preferred embodiment of the continuous frying apparatus, the means for compacting and agitating the potato slices in the second frying zone comprises at least one longitudinal paddle assembly. The longitudinal paddle assembly comprises a rotatable shaft having its axis arranged parallel to the lengthwise dimension of the elongated vessel, and a plurality of vanes affixed to the shaft and extending radially outward from the shaft axis. The vanes dip repeatedly into the frying medium when the shaft is rotated, in order to provide agitation and compaction of the potato slices in the second frying zone. Preferably, the vanes are affixed to the shaft in a manner such that each vane is separated from the next vane both angularly about the shaft axis and axially along the length of the shaft, so that the overall arrangement of vanes along the shaft is helical. The angle between successive vanes may be about 90°, and it is preferred that each vane be adjustable in pitch with respect to the shaft axis. In a particularly preferred arrangement, the longitudinal paddle assemblies are provided in counter-rotating, interdigitating pairs in the second frying zone. Provision may be made for adjusting the height of the longitudinal paddle assemblies in the elongated vessel, preferably by separately adjusting the upstream and downstream ends of the paddle assembly so that its inclination can also be varied.

The continuous frying apparatus may include at least one drum paddle for metering the potato slices through the first frying zone. The drum paddle comprises a rotatable shaft having its axis arranged transverse to the lengthwise dimension of the elongated vessel. A plurality of vanes are affixed to the shaft and extend outward from the shaft axis. The vanes extend substantially across the width of the vessel and are angularly spaced from each other about the shaft axis. A plurality of drum paddles may be provided in the first frying zone, including an upstream drum paddle for sweeping the uncooked potato slices into the first frying zone and at least one downstream drum paddle for metering the potato slices through the first frying zone. The upstream drum paddle is preferably rotated at a faster speed than the downstream drum paddle. A plurality of downstream drum paddles, all rotated at the same speed, may be provided in the first frying zone.

The continuous frying apparatus may further include a submersion conveyor for maintaining the potato slices in a submerged condition in the third frying zone. The submersion conveyor may comprise an endless foraminous belt having its bottom run at or below the surface of the liquid frying medium. Preferably, provision is made for adjusting the height of the submersion conveyor in the elongated vessel. A take-out conveyor may be located downstream of the submersion conveyor in order to remove the completely fried potato chips from the liquid frying medium at the exit end of the vessel. A chip detangling means may be provided for agitating the potato chips on the take-out conveyor in order to separate any potato chips that may have been entangled with each other during the frying process. In a preferred embodiment, the chip detangling means comprises a pair of spaced-apart bars supported at their ends and positioned horizontally across the width of the take-out conveyor, together with means for rotating the bars about a common horizontal axis.

In another aspect, the present invention is directed to a continuous frying apparatus in which separate drive means are provided for the various components which act on the potato slices as they are conveyed through the apparatus. These components may include drum paddles, longitudinal paddle assemblies, a submersion conveyor, a take-out conveyor, and a rotating chip detangler. The drive means for each component is independently controllable so that the relative speeds of the components can be varied.

The present invention is also directed to a rotatable drum paddle for metering the movement of a food product in a continuous frying apparatus containing a heated liquid frying medium. The drum paddle comprises a central shaft and a plurality of vanes carried by the shaft. Each vane comprises a supporting frame, slot-defining means carried by the supporting frame for providing a pair of facing slots, and a sheet of thermoplastic material having its edges removably received in the facing slots and serving as a paddle blade. Preferably, the slots face each other at an angle and the sheet of thermoplastic material is wider than the distance between the slots, so that the thermoplastic sheet assumes a curved or bowed configuration when retained between the slot-defining means. The thermoplastic sheet is preferably made of polytetrafluorethylene (PTFE) so that the food product does not stick to the paddle blade, and is provided with a plurality of perforations to allow a heated liquid frying medium to pass through the blade.

The present invention is also directed to a rotatable agitating device for use in a continuous frying apparatus. The agitating device comprises a rotatable central shaft carrying a plurality of spokes extending radially outward from the shaft axis, and an independently rotatable outer frame in surrounding relationship with the central shaft. The outer frame carries a plurality of spokes extending radially inward toward the central shaft, these spokes being arranged in an interdigitating manner with respect to the spokes carried by the central shaft. In a preferred embodiment, the spokes carried by the central shaft are arranged in a staggered manner with an angular spacing from one spoke to the next, and the spokes carried by the outer frame are arranged in straight rows. Thus, when the central shaft and the outer frame are rotated relative to each other, not all of the spokes carried by the central shaft become aligned with the corresponding spokes carried by the outer frame at the same time. This avoids the abrupt increase in rotational resistance that would occur if all of the spokes were to align simultaneously while immersed in a suspension of potato slices or other food products large enough to become caught between the spokes.

BRIEF DESCRIPTION OF THE DRAWINGS

The various objects, advantages and novel features of the present invention will be more readily apparent from the following detailed description when read in conjunction with the appended drawings, in which:

FIGS. 1 and 2 are side and top views, respectively, of a complete potato chip production line employing a continuous frying unit of the type contemplated by the present invention;

FIGS. 3 and 4 are side and top views, respectively, of the continuous frying unit, with the top hood removed to illustrate certain internal details;

FIGS. 8-11 are side, end and top views of the second frying zone of the continuous frying unit;

FIG. 19 is a side view illustrating the manner in which certain components are mounted within the continuous frying unit;

Throughout the drawings, like reference numerals will be understood to refer to like components.

DETAILED DESCRIPTION OF THE PREFERRED EMBODIMENTS

Figure 5:
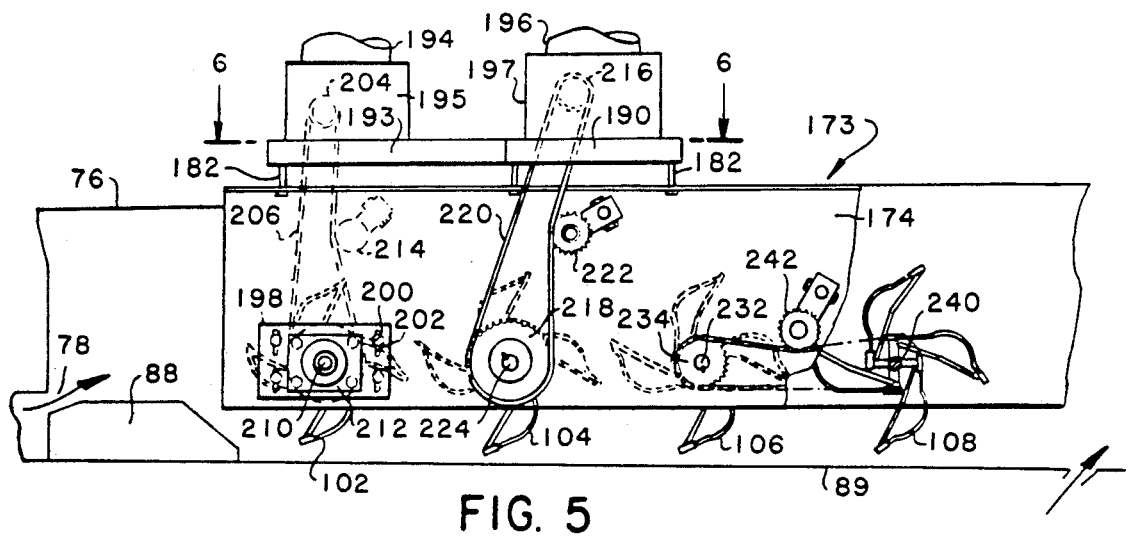
FIGS. 5-7 are side, top and end views, respectively, of the first frying zone of the continuous frying unit.

FIGS. 1 and 2 are side and top views, respectively, of a complete potato chip production line 30 of the type contemplated by the present invention. Peeled whole potatoes (not shown) are delivered by a wire mesh conveyor 32 to a hopper 34. The potatoes are removed from the hopper 34 and conveyed vertically by means of an inclined conveyor 36 to a slicing station 38. The slicing station 38 utilizes a conventional type of slicer, such as an Urschel variable thickness slicer, for cutting the whole potatoes into slices of the desired thickness. From the slicing station 38, the potato slices are delivered to the input side of a slice washer 40 of the perforated drum type. The slice washer serves to remove surface starch from the potato slices, which can cause the slices to stick together during frying. After washing, the potato slices are removed from the output end of the slice washer 40 by a wire mesh conveyor 41, which allows water to drain from the slices, and are dried by means of an air knife 42. The air knife 42 is supplied with unheated air from a duct 43. The potato slices are then delivered by the conveyor 42 into the entrance end 44 of the continuous frying unit 46, the construction and operation of which are the subject of the present invention.

In the continuous frying unit 46, the potato slices are conveyed through a succession of frying zones in a continuously recirculated bath of heated liquid frying medium, such as oil. For most of its length, the frying unit 46 is covered by a hood or canopy 48 which reduces heat loss and assists in the containment of oil and water vapor. A duct 50 is provided to vent these vapors to the atmosphere. At the exit end 52 of the frying unit, the completely fried potato chips are removed from the heated oil by means of a take-out conveyor 54. The take-out conveyor is made of wire mesh in order to allow excess oil to drain from the potato chips and return to the frying unit 46. A second conveyor 56 of similar design carries the potato chips beneath a salter 58 and then delivers them to a vibrating ramp 60. The ramp 60 leads to a similar ramp 62 which carries the potato chips to other equipment (not shown) for packaging, labeling and so on.

FIGS. 3 and 4 are side and top views, respectively, of the continuous frying unit 46. In these views, the hood 48 has been removed for clarity. In addition, the orientation of the frying unit 46 has been reversed from that shown in FIGS. 1 and 2, so that the entrance end 44 of the frying unit is shown on the left and the exit end 52 is shown on the right. The frying unit 46 includes an elongated vessel or trough 76 which extends from the entrance end 44 of the frying unit to the exit end 52. A heated liquid frying medium, preferably oil, is admitted to the vessel 76 through a first inlet port 78, a second inlet port 80, and a third inlet port 82. All three inlet ports are slot-shaped and extend across the width of the vessel 76.

The first inlet port 78 is located at the entrance end of the vessel and faces in the direction toward the exit end. Heated frying oil from a gas-fired heat exchanger or other heat source (not shown) is supplied through a pipe 83 and mixed with cooler oil supplied through a second pipe 84. The cooler oil is withdrawn directly from the exit end of the vessel and does not pass through the heat exchanger. The mixture of heated and partially cooled oil is supplied under pressure to the inlet port 78 through a pair of manifold assemblies 85, 86 and a weir device 87. The weir device contains baffles for producing a uniform, laminar flow of oil across the width of the vessel 76 with a minimum of turbulence. The oil expelled from the inlet port 78 passes over a false bottom 88 which reduces the depth of the frying oil and thereby increases its velocity. The increased velocity of the frying oil tends to prevent the potato slices from sticking to each other and to the inside surfaces of the vessel 76. This is sometimes a problem at the beginning of the frying process, when the slices contain the greatest amount of water. To reduce sticking of the potato slices to the false bottom 88, this component is made of polytetrafluoroethylene (PTFE), a thermoplastic material which is sold by the Dupont Company under the trademark "Teflon". The false bottom 88 is not essential to the operation of the frying unit 46 and may be omitted if desired.

The second oil inlet port 80 is located in the bottom wall 89 of the vessel 76 at a point approximately one-third of the distance from the entrance end of the vessel to its exit end. Heated frying oil is supplied under pressure to the second inlet port 80 through a pipe 90 and manifold assembly 92. Although the second inlet port 80 is situated so that it expels oil into the bottom of the vessel 76, the internal passages of the inlet port are inclined at an angle of about 45° with respect to the vertical, as shown, so that the oil is expelled in a downstream direction toward the exit end 52 of the frying unit. The particular angle employed is not critical, as long as it is sufficient to impart a velocity to the oil in the desired direction.

The third oil inlet port 82 is located in the bottom wall 89 of the vessel 76 at a point approximately two-thirds of the distance from the entrance end of the vessel 76 to its exit end. Heated frying oil is supplied under pressure to the inlet port 82 by means of a pipe 94 and manifold assembly 96, which are similar to those used for the second inlet port. As in the case of the second inlet port 80, the internal passages of the inlet port 82 are inclined at an angle of 45° in order to discharge the oil in a downstream direction toward the exit end 52 of the frying unit.

The downstream velocity that is imparted to the frying oil by the inlet ports 78, 80 and 82 serves as the primary means for conveying the potato slices from the entrance end 44 of the frying unit to the exit end 52. The flow of the oil in this direction may be promoted by providing the bottom wall 89 of the vessel 76 with a slight downward inclination.

At the exit end of the vessel 76, the heated frying oil is withdrawn through a perforated plate 98 into a plenum 100. The bottom wall 89 of the vessel 76 has a further downward inclination in this area, as shown, in order to assist the flow of oil into the plenum 100. From the plenum 100, the oil is routed out of the frying unit 46 for filtering and reheating, and is then reintroduced into the vessel 76 through the three inlet ports 78, 80 and 82. In this way, a continuous recirculation of heated frying oil is maintained in the frying unit 46. As previously noted, some of the oil withdrawn from the exit end of the vessel 76 is recycled directly into the first inlet port 78 without reheating. This allows more effective control over the oil temperature in the initial part of the frying unit 46 as will be discussed hereinafter.

The provision of first, second and third inlet ports spaced along the length of the cooking vessel 76 allows the vessel to be divided into three distinct frying zones. The first frying zone extends from the first oil inlet port 78 to a point immediately upstream of the second oil inlet port 80. Similarly, the second frying zone extends from the second oil inlet port 80 to a point immediately upstream of the third oil inlet port 82, and the third frying zone extends from the third oil inlet port 82 to the exit end of the vessel 76. As will be described hereinafter, it will ordinarily be preferable to control the temperature and quantity of the frying oil admitted through each inlet port in a manner such that the three frying zones are maintained at different temperatures. In this way, control can be exercised over the time-temperature profile encountered by the potato slices as they are conveyed through the frying unit, so that potato chips having the desired characteristics can be obtained.

In order to achieve complete frying, the potato slices must be constrained to move at a rate slower than that of the frying oil as they traverse the length of the vessel 76. In addition, it is desirable to be able to control the residence time of the potato slices in each frying zone. In the first frying zone, these objectives are met by providing a series of motor-driven drum paddles 102-108, which are oriented with their axes transverse to the lengthwise dimension of the vessel 76. The vanes of each drum paddle extend substantially across the width of the vessel 76 and are angularly spaced from each other about the paddle shaft. The vanes of all drum paddles 102-108 are made of Teflon, to prevent the potato slices from sticking to the vanes. The function of the first drum paddle 102 is to sweep the raw potato slices that are introduced above the false bottom 88 into the first frying zone. The first drum paddle 102 is driven independently of the remaining drum paddles 104-108, and is preferably rotated somewhat faster than the other drum paddles in order to sweep the raw potato slices that are introduced above the false bottom 88 into the first frying zone. The faster speed of the drum paddle 102 also creates increased turbulence in the frying oil near the entrance end 44 of the frying unit, which reduces sticking between the raw potato slices. The remaining drum paddles 104-108 are rotated at the same speed by means of a common drive system, and serve to meter the potato slices through the remainder of the first frying zone at a rate which provides the desired residence time in this zone. The direction of rotation of all four drum paddles 102-108 is the same, and is indicated by the arrows in FIG. 3.

In the second frying zone, a number of additional paddle assemblies 110-120 are arranged with their axes parallel to the lengthwise dimension of the vessel 76. Each paddle assembly comprises a central shaft 122 and a number of Teflon vanes 124 which are attached to the shaft in a helical pattern. In the illustrated embodiment, six paddles 110-120 are equally spaced across the width of the cooking vessel 76. All six paddle assemblies are powered by the same drive system and rotate at the same speed, but the paddles of each successive pair counter-rotate relative to each other and interdigitate, so that the vanes of each assembly rotate through the gaps between the vanes of the adjacent assembly. The paddle assemblies 110-120 serve to agitate and compact the potato slices in the second frying zone, and are particularly useful for producing folded potato chips as will be described hereinafter. The longitudinal paddle assemblies also serve to meter the potato slices through this zone as a consequence of the augering action of the helically mounted vanes.

At the end of the second frying zone, a single drum paddle 126 with bent vanes is mounted with its axis transverse to the lengthwise dimension of the vessel 76. This drum paddle is rotated by a separate drive motor, and serves to restrict the passage of the potato slices out of the second frying zone so that the proper residence time is achieved in that zone. The drum paddle 126 differs from the previous drum paddles 102-108 in that its vanes are made of perforated stainless steel, rather than Teflon. The potato slices are sufficiently cooked by the end of the second frying zone so that sticking is no longer a problem, and hence the use of Teflon for the vanes of the drum paddle 126 is unnecessary.

When the potato slices reach the beginning of the third frying zone, they have been cooked sufficiently to become buoyant in the frying oil and must be forcibly submerged during the remaining part of the frying process. This is achieved by means of a submersion conveyor 128, which comprises an endless wire mesh belt 130 carried by a number of sprockets 132-136. The height of submersion conveyor is adjustable and is normally set such that the bottom run of the belt 130 is maintained just at the surface of the frying oil. This insures that the potato slices remain submerged but at the same time reduces clustering of the slices by allowing them to occupy the entire depth of the frying oil. The drive system for the submersion conveyor 128 is independent of those used to drive the drum paddles 102-108, longitudinal paddle assemblies 110-120, and drum paddle 126. The direction of movement of the submersion conveyor is indicated by the arrow in FIG. 3.

At the end of the third frying zone, the fried potato slices pass over the perforated plate 98 and are pushed onto the take-out conveyor 54. The take-out conveyor 54 comprises an endles belt made of wire mesh and carried by a pair of sprockets 140 and 142. A separate drive motor is provided for the take-out conveyor 54. In addition to removing the completely fried potato slices from the bath of frying oil, the take-out conveyor 54 allows excess oil to drain from the fried slices and return to the cooking vessel 76.

Positioned just above the top run of the take-out conveyor 54, in the area immediately downstream of the submersion conveyor 128, is a rotatable chip detangler 144. This device serves to separate any potato chips which may have become entangled with each other at the downstream end of the submersion conveyor 128. This is a particular problem when the continuous frying unit 46 is operated in such a way as to produce a high proportion of folded or crumpled potato chips, as will be described hereinafter. The chip detangler 144 is powered by a separate drive system so that its speed of rotation may be adjusted independently of the other components.

Figure 6:
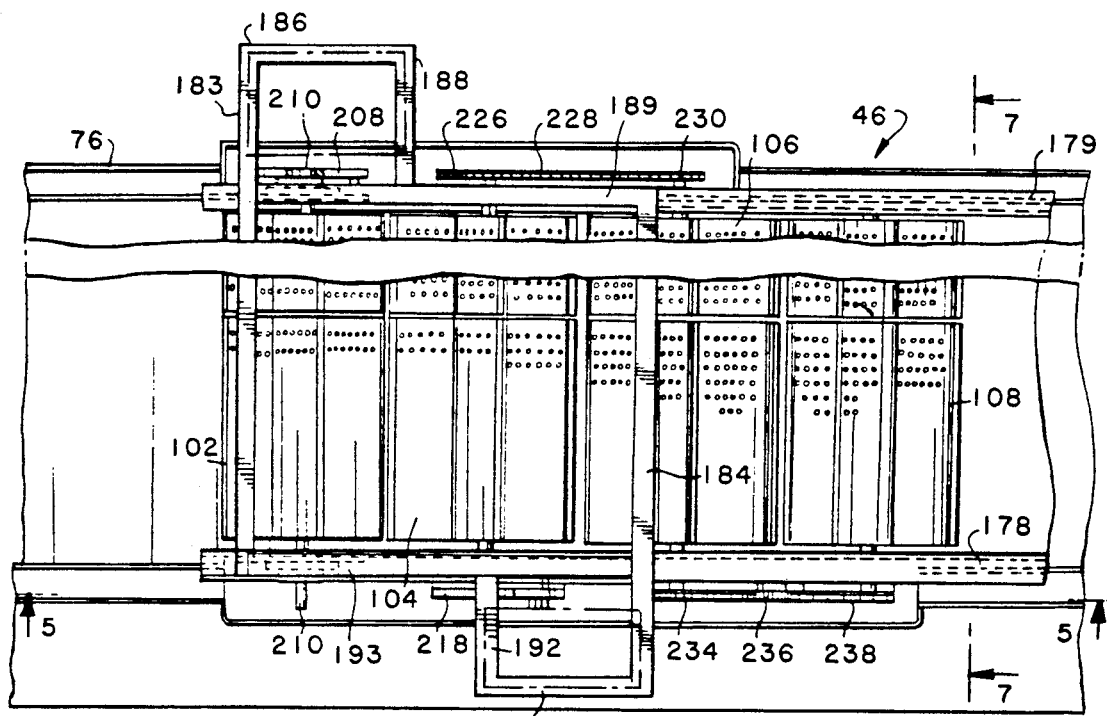
Figure 7:
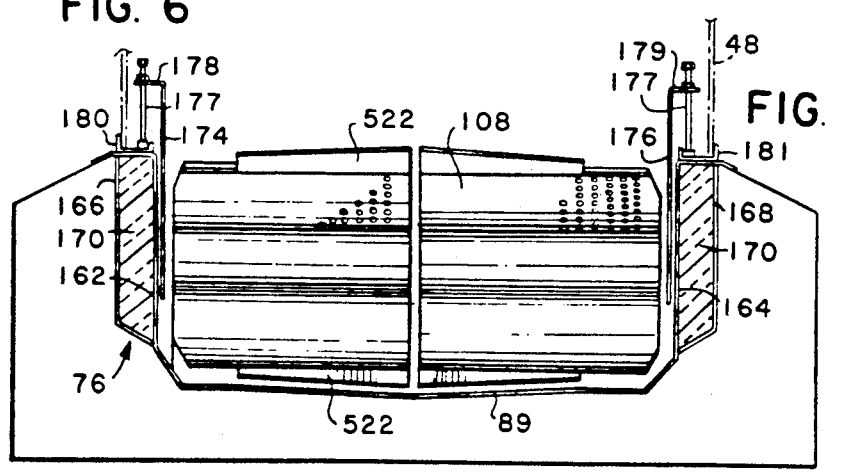
Figure 8:
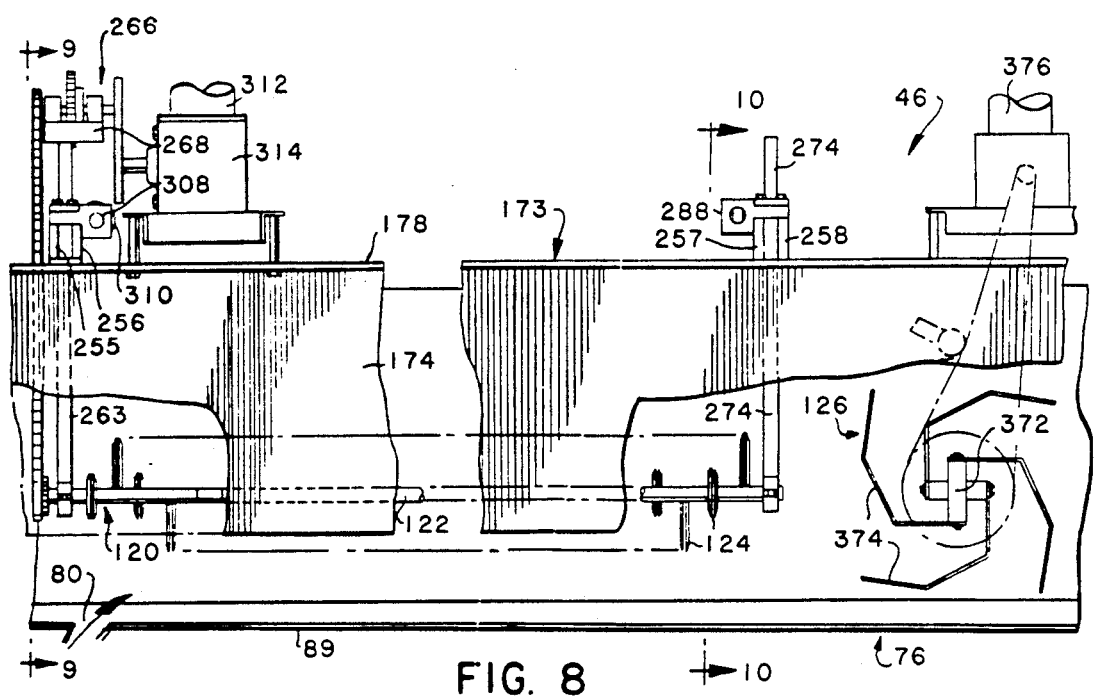

The first frying zone of the continuous frying unit 46 is illustrated in detail in FIGS. 5-7. As best seen in FIG. 7, the cooking vessel 76 employs a double-wall construction which comprises inner side walls 162, 164 and outer side walls 166, 168. Insulation 170 is provided between the inner and outer walls on each side of the vessel 76 in order to minimize heat loss from the frying oil. The bottom wall 89 of the cooking vessel has a shallow V-shape, as shown, which assists in channeling fines toward the center of the vessel and also in promoting proper drainage of water during cleaning.

In order to support the four drum paddles 102-108, a frame assembly 173 including a pair of side plates 174, 176 is suspended within the vessel 76 by means of a number of bolts 177. The top edges of the side plates 174, 176 are bent to form horizontal flanges 178, 179. The bolts 177 are engaged with threaded bores formed in the flanges and extend downward into contact with drain troughs 180, 181 extending along the upper edges of the vessel 76. The side plates 174, 176 of the frame assembly are parallel to and spaced slightly inside the inner side walls 162, 164 of the vessel 76. A number of additional bolts 182 are affixed to the flanges 178, 180 and carry a pair of horizontal cross-members 183, 184 which extend between the two side plates. Additional structural members 186-193 are carried by the bolts 181 and are connected to the cross members 183, 184 to serve as supports for the drive motors 194, 196.

The drum paddle 102 is rotatably mounted between the side plates 174, 176 of the frame assembly 173 by means of a pair of mounting plates, one of which is indicated at 198 in FIG. 5. The mounting plate 198 is secured to the interior surface of the side plate 174 by a number of screws 200 which pass through vertical slots 202 in the mounting plate and engage threaded holes in the side plate. The slots 202 allow the vertical position of the mounting plate to be varied with respect to the side plate 174, so that the vertical height of the drum paddle 102 with respect to the interior bottom surface of the vessel 76 can be adjusted during initial installation.

The drum paddle 102 is driven from the top of the frame assembly 173 by means of the drive motor 194 and gearbox 195. A first sprocket 204 is affixed to the output shaft of the gearbox 195 and is connected by means of a chain 206 to a second sprocket 208 that is affixed to the shaft 210 of the drum paddle. The ends of the shaft 210 are received in a pair of bearing assembly, one of which is indicated at 212 in FIG. 5. The bearing assembly 212 is rigidly affixed to the mounting plate 198 at one end of the shaft 210. The same arrangement is duplicated at the opposite end of the shaft. A chain tensioner 214 maintains proper tension in the chain 206. Each of the succeeding drum paddles 104, 106 and 108 is mounted between the side plates 174, 176 by means of mounting plates and bearing assemblies which are essentially identical to those used for the first drum paddle 102.

The drum paddles 104-108 are powered by a common drive system, and are preferably rotated at a speed different from that of the first drum paddle 102. To this end, a separate drive motor 196 and gearbox 197 are employed. A sprocket 216 is affixed to the output shaft of the gearbox 197, and this sprocket drives a further sprocket 218 by means of a chain 220. A tensioner 222 maintains proper tension in the chain 220. The sprocket 218 is affixed to the shaft 224 of the drum paddle 104 in order to impart rotation to the vanes of the paddle. At the opposite end of the drum paddle 104, a second sprocket 226 is affixed to the shaft 224. This sprocket is attached by means of a chain 228 to a further sprocket 230, which is affixed to the shaft 232 of the drum paddle 106. At the opposite end of the drum paddle 106, the shaft 232 carries a second sprocket 234. A chain 236 connects the sprocket 234 to a similar sprocket 238 affixed to the shaft 240 of the drum paddle 108.

By virtue of the foregoing arrangement, it will be seen that the drive motor 196 causes the three drum paddles 104, 106 and 108 to rotate in unison. Preferably, the diameters of the sprockets 226 and 230 are equal, and the same is true of the sprockets 234 and 238. In this way, the rotational speed of all three drum paddles 104-108 will be the same. However, should it be desired to cause the drum paddles 104-108 to rotate at different speeds, this may be accomplished by changing the ratio of the sprocket diameters, or by providing each of the drum paddles with a separate drive motor.

FIGS. 8-11 illustrate the details of the second frying zone of the continuous frying unit 46. As in the case of the drum paddles used in the first frying zone, the longitudinal paddle assemblies 110-120 are supported by the side plates 174, 176 of the frame assembly 173. First and second pairs of bars 255, 256 and 257, 258 held apart by spacers 259, 260 are secured to the flanges 178, 180 and serve as cross-members for connecting the side plates 174, 176 of the frame assembly 173 in this zone. The slot between the upstream bars 255 and 256 slidably receives three vertical support rods 261, 262 and 263. These support rods form part of a vertically movable frame 266 which supports the upstream ends of the longitudinal paddle assemblies 110-120. The frame 266 is completed by an upper cross-member 268 which is affixed to the upper extremities of the support rods 261, 262 and 263, and by a lower cross-member 270 which is affixed to the lower ends of these rods.

A somewhat similar arrangement is used to support the downstream ends of the longitudinal paddle assemblies 110-120. The slot between the bars 257 and 258 slidably receives a pair of vertical support rods 272, 274. These rods form a part of a second vertically movable frame 276. The frame is completed by a bottom cross-member 278 which connects the lower ends of the support rods 272, 274.

In order to adjust the height of the longitudinal paddle assemblies 110-120 in the cooking vessel 76, means are provided for adjusting the vertical positions of the frames 266, 276 with respect to the corresponding horizontal cross-members 255, 256, 257, and 258. In the case of the downstream frame 276, this is accomplished by means of a pair of threaded rods 278, 280 which have their lower ends affixed to the bottom cross-member 278. The upper ends of the threaded rods 278, 280 are engaged with threaded bores which are formed through the center of pinions 282, 284. The pinions are rotatably mounted in carriers 286, 288 affixed to the bars 257, 258. The pinions 282, 284 are held in engagement with worm gears 290, 292. A shaft 294 connects the two worm gears and constrains them to rotate in unison. When it is desired to adjust the height of the frame 276, a crank handle 296 is engaged with a stub shaft 298 affixed to the worm gear 292. Manual rotation of the crank 296 causes both worm gears 290, 292 to rotate at the same speed, thereby causing a corresponding rotation of the pinions 282, 284. By virtue of the threaded engagement between the threaded rods 278, 280 and the threaded bores in the pinions 282, 284, rotation of the pinions will cause both rods to move vertically and thereby raise or lower the entire frame 276.

Figure 9:
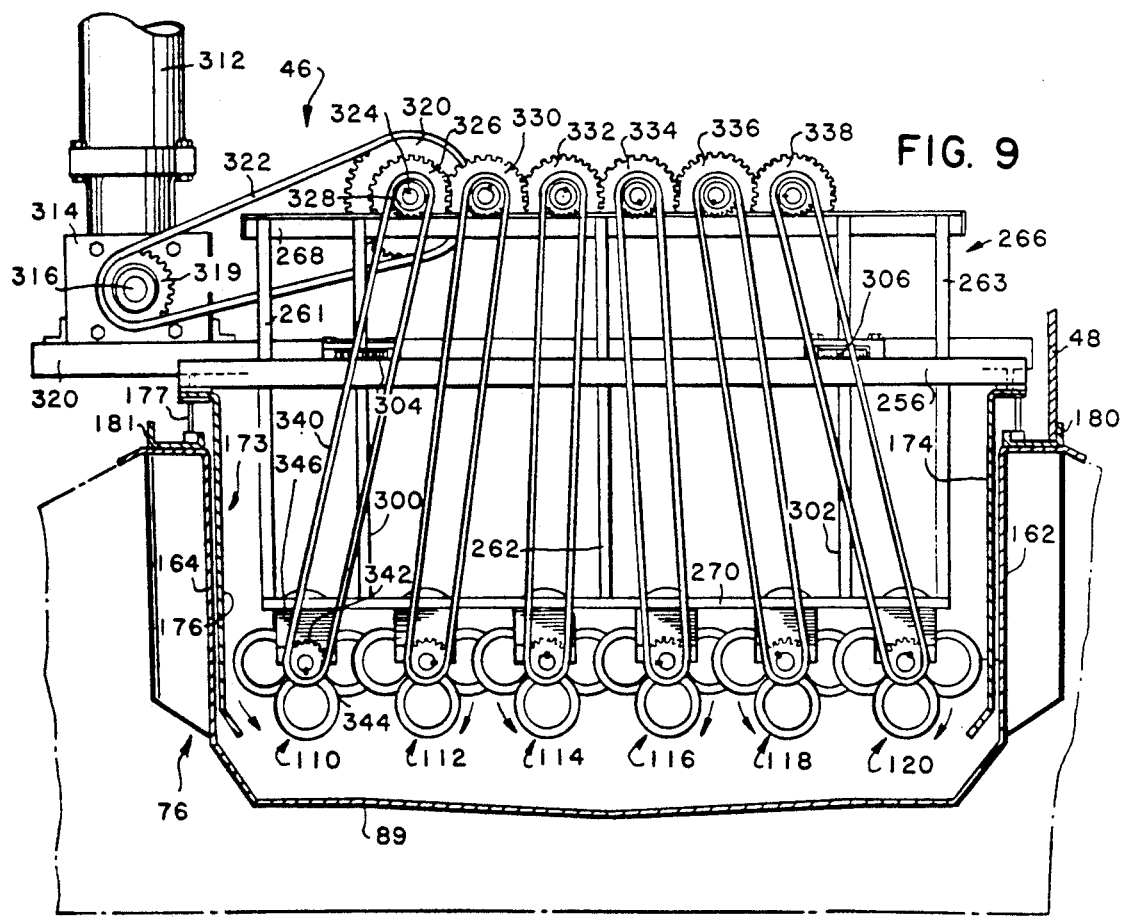

The arrangement for raising and lowering the upstream frame 266 is essentially the same. Referring to FIG. 9, the threaded rods are indicated at 300 and 302, and the corresponding pinions are indicated at 304 and 306. The threaded rods 300, 302 are arranged similarly to those of the downstream frame 276, except that their upper extremities are not free but instead are affixed to the upper cross-member 268. The pinion carrier 308 and worm gear 310 located on the near side of the upstream frame 266 can be seen in FIG. 8, and it will be understood that a similar assembly is provided on the opposite end of the upstream frame in order to duplicate the arrangement employed on the downstream frame 276. The hand crank 296 may be used to adjust the vertical position of the upstream frame 266, in the manner already described, in order to adjust the height of the upstream end of the paddle assemblies 110-120 with respect to the interior bottom surface of the vessel 76.

The provision of separate upstream and downstream frames 266, 276 allows the heights of the upstream and downstream ends of the paddle assemblies 110-120 to be adjusted independently. It will usually be desirable to adjust both ends to the same height so that the paddle assemblies remain in a horizontal orientation. However, if increased compaction of the potato slices is desired near the end of the second frying zone, the downstream ends of the paddle assemblies 110-120 can be set lower than the upstream ends. Conversely, the downstream ends of the paddle assemblies 110-120 can be set higher than the upstream ends if it is desired to decrease the compaction of the potato slices as they are conveyed through the second frying zone.

A single drive motor 312 is used to impart rotation to all six of the longitudinal paddle assemblies 110-120. The drive motor 312 is coupled to a gearbox 314 and is mounted on a pair of horizontal cross-members 318, 320. The cross-members 318, 320 extend transversely across the width of the cooking vessel 76 and are fixed to the upper flange portions 178, 180 of the side plates 174, 176. The output shaft 316 of the gearbox 314 carries a sprocket 319 which transmits rotary motion to a further sprocket 320 by means of a chain 322. The sprocket 320 is rotatably mounted near one end of the upper horizontal cross-member 268 of the upstream frame 266. The sprocket 320 is carried by a shaft 324, and this shaft is also affixed to a spur gear 326 and sprocket 328. The spur gear 326 is the first of a series of six adjacent spur gears 326–338, each held in meshing engagement with the spur gears adjacent to it. As in the case of the first spur gear 326, each of the succeeding spur gears 330–338 is connected by means of a shaft to a somewhat smaller sprocket; in the interest of clarity, however, reference numerals have been omitted from these additional shafts and sprockets in FIG. 9. The sprocket 324 associated with the spur gear 326 is connected by means of a chain 340 to a similar sprocket 342 located below the lower horizontal cross-member 270. The sprocket 342 is rigidly affixed to the shaft 344 of the paddle assembly 110, and this shaft is journalled in a carrier 346 which is affixed to the underside of the lower cross-member 270. In a similar manner, the sprockets associated with the spur gears 330–338 are connected by means of chains to other sprockets which drive the shafts of paddle assemblies 112–120, as will be evident from FIG. 9. The shafts 344 and 348–356 of the paddle assemblies 110–120 extend longitudinally toward the downstream frame assembly 276, and their downstream ends are journalled in carriers 358–368 affixed to the underside of the lower cross-member 278 as illustrated in FIG. 10.

It will be readily appreciated that rotation of the output shaft 316 of the gearbox 314 will cause adjacent pairs of the paddles 110–120 to counter-rotate, as a result of the meshing engagement between adjacent pairs of the sprockets 326 and 330–338. Thus, if the output shaft 316 rotates in a counter-clockwise direction, for example, paddle assemblies 110, 114 and 118 will also rotate in a counter-clockwise direction, while paddle assemblies 112, 116 and 120 will rotate in a clockwise direction. The vanes of longitudinal paddle assemblies 110, 114 and 118 rotate in the same angular phase, and the same is true of the counter-rotating paddle assemblies 112, 116 and 120. The counter-rotation of adjacent pairs of paddles of longitudinal paddle assemblies, coupled with the interdigitation of the paddle vanes 124 as explained previously, produces an enhanced agitation and compaction of the potato slices as they pass through the second frying zone. In addition, the helical arrangement of vanes gives rise to an inherent augering action which meters the potato slices through this zone. The vanes 124 can be adjusted in pitch in order to control the flow of oil and potato slices in the vessel 76, as will be described in further detail hereinafter.

A drum paddle 126 with bent vanes is positioned near the downstream end of the second frying zone in order to restrict the passage of potato slices out of this zone, so that the desired residence time and degree of compaction are achieved. The drum paddle 126 is positioned with its shaft 372 transverse to the lengthwise dimension of the vessel 76, in a manner similar to the drum paddles 102–108 of the first frying zone. As noted earlier, however, the vanes 374 of the drum paddle 126 are made of perforated stainless steel rather than Teflon, since sticking of the potato slices is not a serious problem at this point in the frying process. The size of the perforations 375 is sufficient to allow the frying oil, but not the potato slices, to pass through the vanes 374.

Referring to FIG. 10, the drum paddle 126 is rotated by a means of a separate drive motor 376. The drive motor 376 is coupled to a gearbox 378 which has an output shaft 380. A sprocket 382 is attached to the output shaft 380 and is connected by means of a chain 384 and a further sprocket 386 to the shaft 372 of the drum paddle 370. The ends of the drum paddle shaft 372 are rotatably mounted between the side plates 174, 176 by means of mounting plates 388, 390 and bearing assemblies 392, 394. These are essentially identical to the mounting plate 198 and bearing assembly 212, respectively, that were described previously in connection with FIG. 5.

Figure 12:
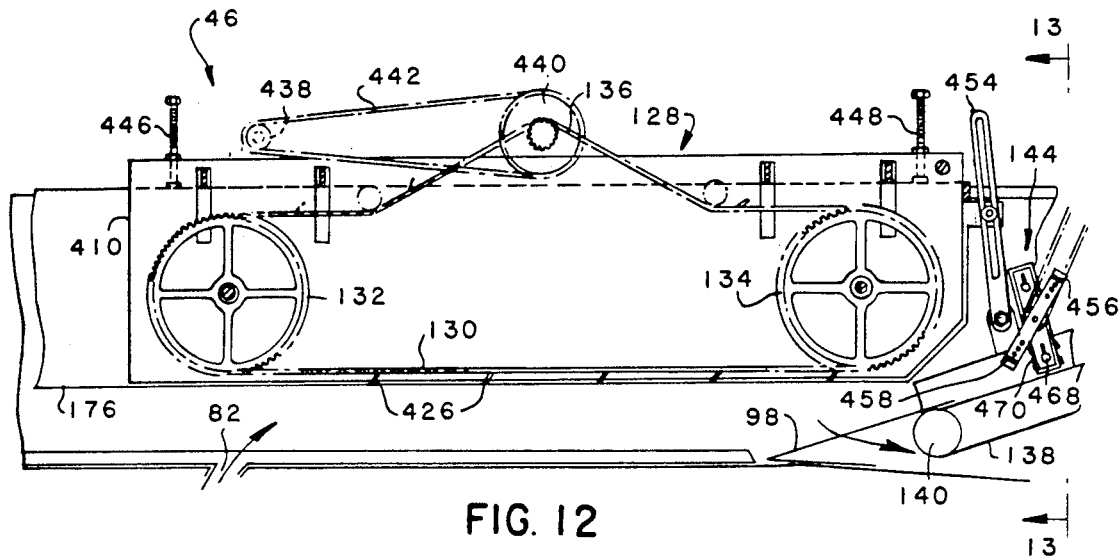
FIGS. 12-14 are side, end and top views, respectively, of the third frying zone of the continuous frying unit.
Figure 13:
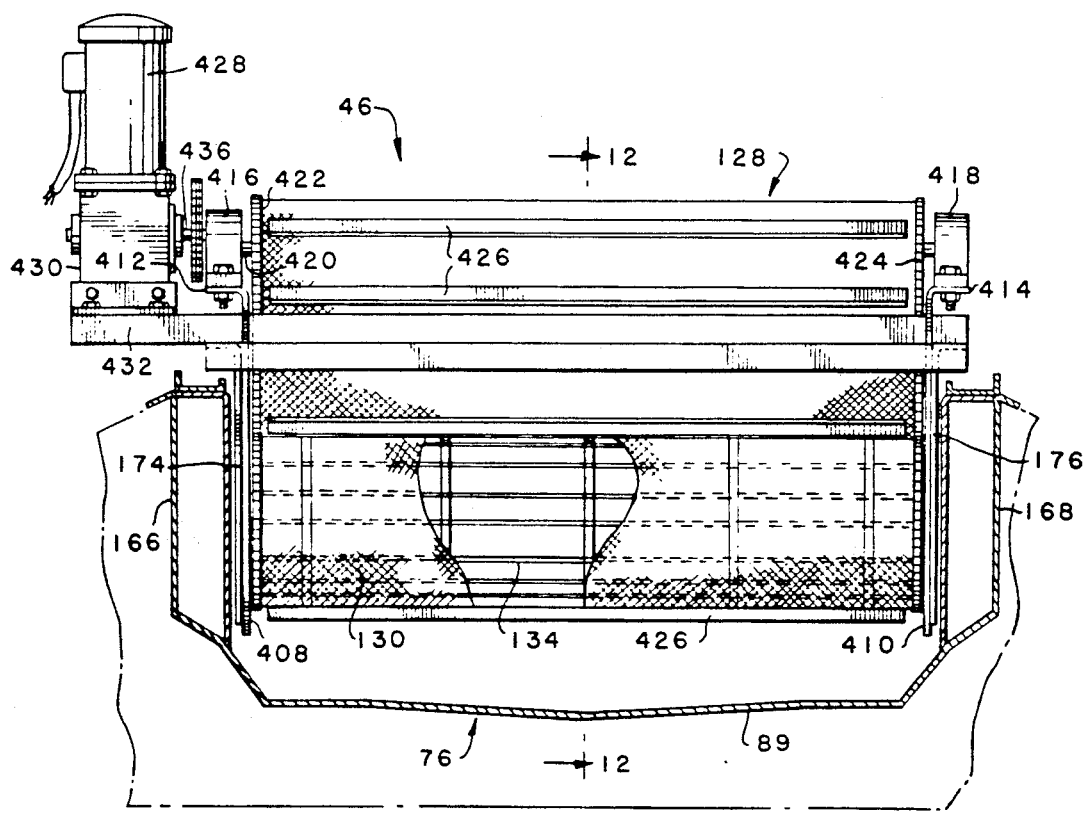
Figure 14:
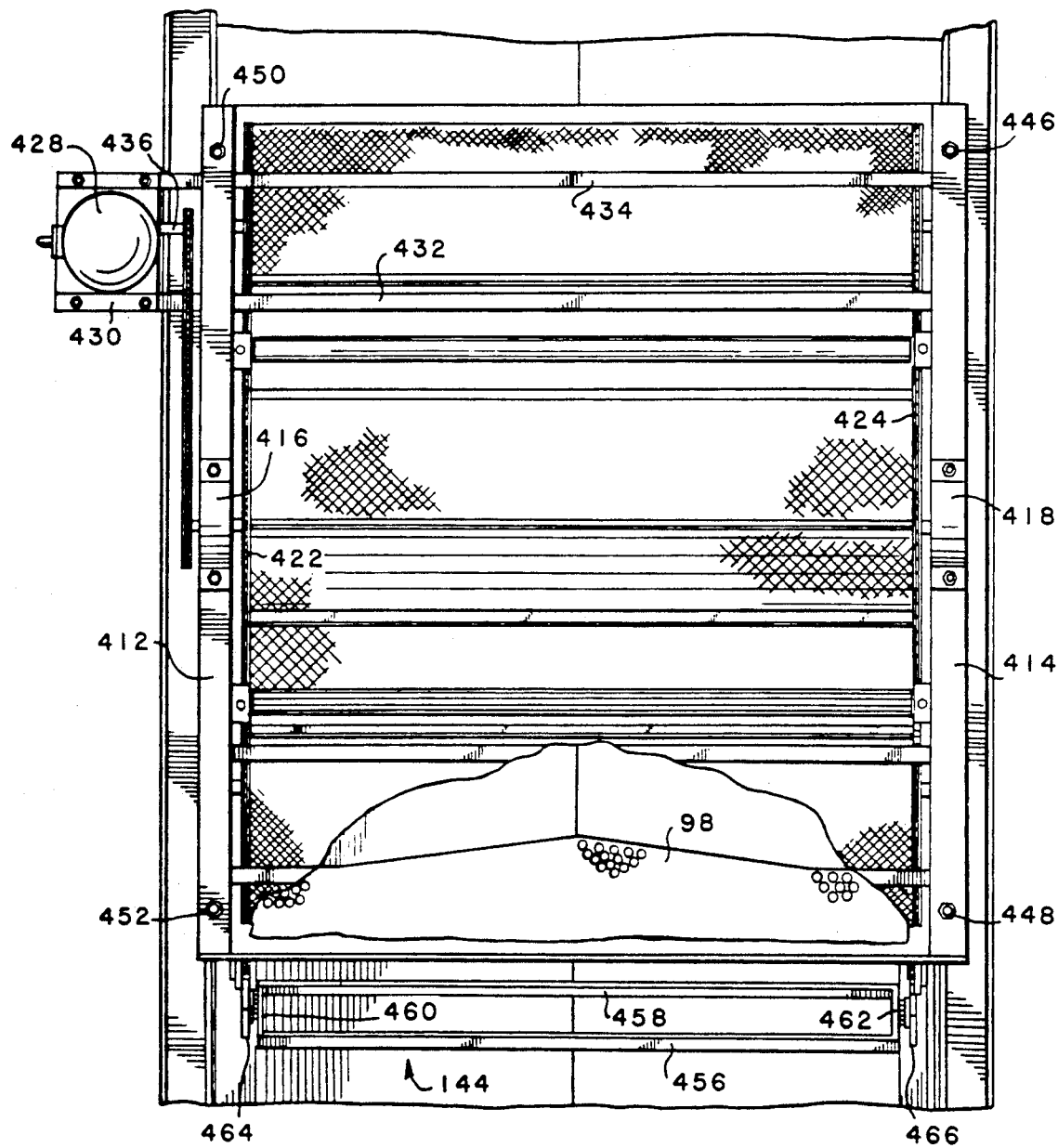

FIGS. 12–14 are side, end and top views, respectively, illustrating the details of the third frying zone. In this zone, the submersion conveyor 128 maintains the now-buoyant potato slices in a submerged condition during the final interval of the frying process. The submersion conveyor 128 is mounted between a pair of support plates 408, 410 which are positioned inside and parallel to the side plates 174, 176. The upper edges of the support plates 408, 410 are bent to form horizontal flanges 412, 414 which serve as mounting surfaces for a pair of bearing assemblies 416, 418. The bearing assemblies support the ends of a rotatable shaft 420, which serves as the drive shaft for the submersion conveyor 128. The shaft 420 carries two sprockets, one of which is indicated at 136 in FIG. 12. The sprockets engage two chains 422, 424 which are affixed to the lateral edges of the endless wire mesh belt 130. The belt 130 passes around two large sprockets 132, 134 which engage the edges of the belt in a similar manner. The path of the belt 130 is such that its lower run is at or just below the surface of the frying oil in the vessel 76. The outwardly facing surface of the belt 130 is provided with a number of vanes or ribs 426, which assist in controlling the movement of the potato slices through the third frying zone.

The submersion conveyor 128 is powered by a separate drive system which includes a motor 428 and gearbox 430. These components are mounted on a pair of horizontal cross-members 432, 434 which are affixed to the upper flanges of the side plates 174, 176. The output shaft 436 of the gearbox 430 carries a sprocket 438, and this sprocket drives a further sprocket 440 by means of a chain 442. The sprocket 440 is affixed to the shaft 420 and powers the drive sprocket 136 of the submersion conveyor 128.

The supporting plates 408, 410 of the submersion conveyor 128 are suspended from the side plates 174, 176 of the frame 173 by means of four bolts 446–452. Two of the bolts 446, 448 are located near the upstream and downstream ends, respectively, of the plate 410. The remaining two bolts 450, 452 are located in similar positions on the plate 408. As will be appreciated from FIG. 12, each of the bolts 446, 448 is engaged with a corresponding threaded hole in the top flange 414 of the plate 410, and extends through the flange so as to be brought into contact with the upper flange of the side plate 176. A similar relationship exists among the second pair of bolts 450, 452, supporting plate 408, and side plate 174. By turning the bolts 446–452, the vertical position of the plates 408, 410 can be changed with respect to the side plates 174, 176, thereby allowing the vertical height of the submersion conveyor 128 to be adjusted relative to the cooking vessel 76. In addition, since each bolt 446–452 can be turned individually, it is possible to adjust the horizontal alignment of the submersion conveyor 128 both longitudinally and transversely.

At the downstream end of the submersion conveyor 128, the completely fried potato chips are removed from the bath of frying oil by means of the take-out conveyor 54. The take-out conveyor 54 is inclined upwardly and is positioned with its lower end immersed in the oil. The perforated plate 98 allows the oil to pass through to the outlet plenum, while preventing the accumulation of potato chips in the area immediately adjacent to the lower end of the take-out conveyor 54. A slip connection 454 is provided between the take-out conveyor 54 and the side plate 176 for allowing limited vertical adjustments of the frame 173 to be made without affecting the height of the take-out conveyor, and for raising the lower end of the take-out conveyor when the frame 173 is raised to a greater height to allow the vessel 76 to be cleaned. The take-out conveyor 54 is powered by a separate drive system which is not shown in FIGS. 12-14.

The chip detangler 144 is positioned just above the top run of the take-out conveyor 44, immediately downstream of the submersion conveyor 128. The chip detangler 144 comprises a pair of spaced-apart bars 456, 458 which are joined at their ends by means of short connecting bars 460, 462. The bars 456, 458 and 460, 462 form an elongated rectangular structure which is positioned transversely across the frying unit 46, so that the bars 456, 458 span the width of the take-out conveyor 54. The chip detangler 144 is rotatably mounted with respect to the side plates 174, 176 by means of a pair of mounting plates 464, 466. As illustrated in FIG. 12, the mounting plate 466 is secured to the side plate 176 by means of screws 468 which pass through slots 470 in the mounting plate. A similar arrangement is employed for the mounting plate 464. The slots allow the chip detangler 144 to be adjusted in height with respect to the take-out conveyor 54, by loosening the screws and moving the mounting plates 464, 466 up or down with respect to the side plates 174, 176.

The chip detangler 144 is powered by a separate drive motor which is not shown in FIGS. 12-14. A chain 472 from the drive motor engages a sprocket 474 which is affixed to the connecting bar 462 of the detangler. In this manner, the detangler 144 is rotated about a horizontal axis which is equidistant between the bars 456 and 458. The preferred direction of rotation is indicated by the arrow in FIG. 12. Rotation of the detangler 144 causes the bars 456, 458 to dip repeatedly into the frying oil at the downstream end of the submersion conveyor 128. This action creates sufficient agitation to separate any potato chips which may have become entangled with each other, but is gentle enough to avoid breaking the now-brittle chips. Use of the chip detangler 144 is not strictly necessary in the present apparatus, and this component may be omitted if it is found that entanglement of the finished potato chips is not a serious problem. Alternatively, the same function may be performed by means of vertically reciprocating bar arranged horizontally across the take-out conveyor 54, in the same position that is occupied by the rotating chip detangler 144.

Figure 15:
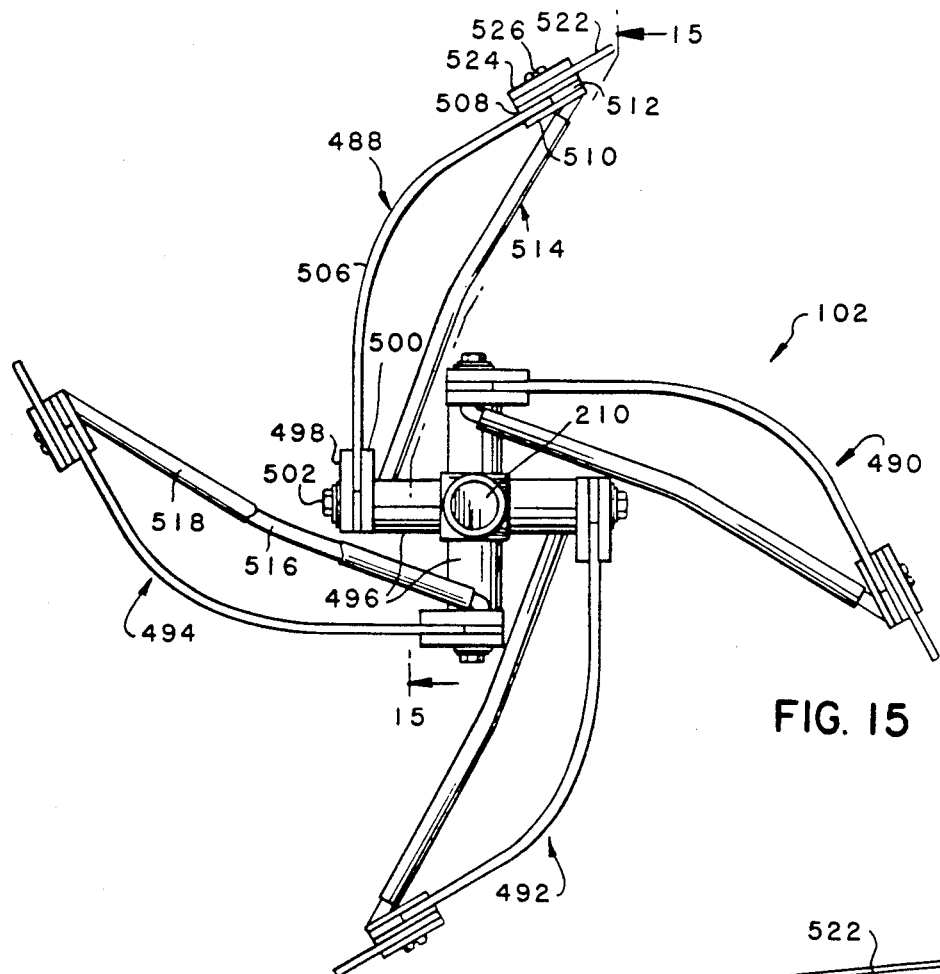
FIGS. 15 and 16 are side and end views, respectively, of one of the drum paddles used in the first frying zone.
Figure 16:
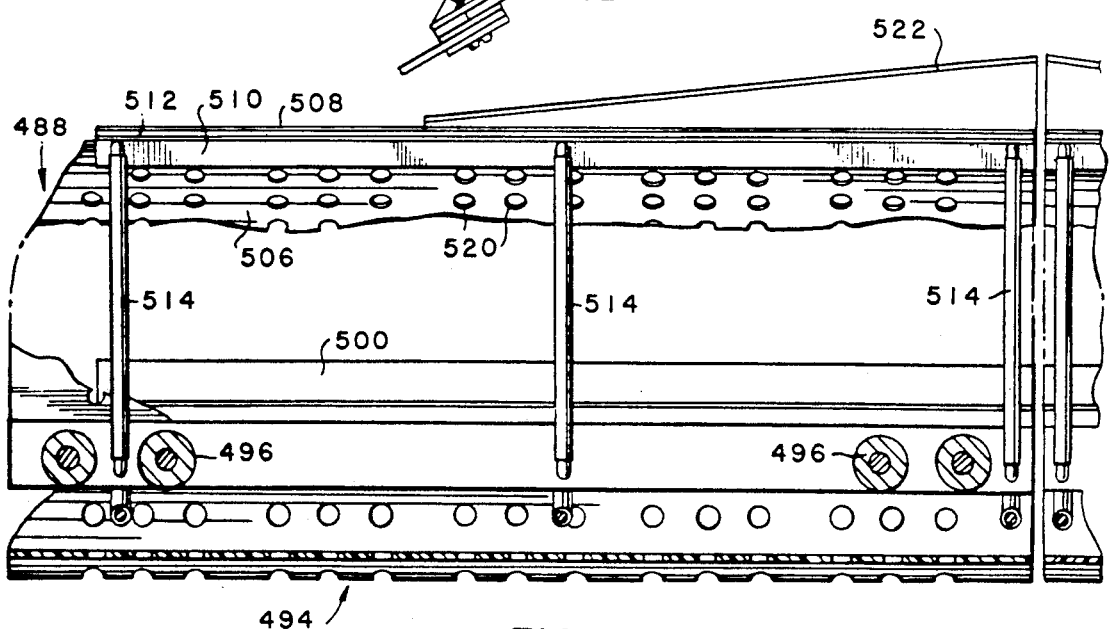

FIGS. 15 and 16 are detailed side and end views, respectively, of the drum paddle 102 used in the first frying zone. The remaining drum paddles 104, 106 and 108 of the first frying zone will be understood to be of similar construction. The drum paddle 102 comprises four identical vanes 488-494 which are mounted on spacers 496 extending radially from the drum paddle shaft 210. Each vane comprises two identical sections which are arranged in end-to-end relationship on the shaft 210 (in FIG. 16, the left-hand section is shown). Each vane section includes two bottom supports 498, 500 which are secured to the outermost ends of the spacers 496 by means of a screw 502. A spacer 504 is received between the bottom supports 498, 500 in order to create a slot of sufficient width to receive the inner edge of a generally rectangular sheet of Teflon 506. The Teflon sheet 506 is preferably about one-eighth inch thick and serves as a paddle blade. The outer edge of the Teflon paddle blade is received in a facing parallel slot formed between a pair of top supports 508, 510 which are similar to the bottom supports 498, 500. A spacer 512 is received between the top supports 508, 519 to maintain the proper slot width. A number of support rods 514 are secured to the bottom supports 498, 500 and extend radially outward to provide mounting points for the top supports 508, 510. Each of the support rods 514 comprises a central metal rod 516 covered by a length of Teflon tubing 518. The support rods can be uncoupled from the top supports 508, 510 to allow the Teflon tubing 518 to be replaced. As best seen in FIG. 15, the Teflon paddle blades 506 assume a curved or bowed configuration between the bottom supports 498, 500 and top supports 508, 510. This is achieved by mounting the bottom supports and top supports so that the slots formed by these supports face each other at an angle, as shown, and by and making the width of the paddle blade 506 greater than the distance between the two slots.

The use of Teflon paddle blades 506 prevents the partially fried potato slices from sticking to the blades in the first frying zone, a problem which occurs when conventional stainless steel paddles are used. However, the Teflon material is subject to warping and rippling as a result of exposure to the hot frying oil. In the arrangement shown in FIGS. 15 and 16, this effect is reduced or eliminated by the bowing of the Teflon paddle blades 506. The bowing lends additional rigidity to the paddle blades, so that they resist warping and rippling, and also allows for a considerable degree of temperature-induced expansion and contraction. This arrangement is also advantageous since the paddle blades 506 are held in place between the facing parallel slots of the top supports 508, 510 and bottom supports 498, 500 simply by virtue of the resiliency of the Teflon material, and can be removed quite easily by pulling the edges of the paddle blade out of the slots in which they are held.

Preferably, the Teflon paddle blades 506 are provided with a large number of small perforations 520, as shown in FIG. 16. These perforations are smaller than the size of the potato slices, thereby allowing the heated frying oil to circulate through the first frying zone while restraining the movement of the potato slices. Perforations in the vanes of a drum paddle are generally found to cause greater sticking of the potato slices, although this effect is greatly reduced in the present case by the use of Teflon for the paddle blade material. Sticking of the slices to the support rods 514 is reduced by covering the support rods with Teflon tubing 518 as described earlier.

In order to allow the edges of the vanes 488-494 to conform as closely as possible to the interior bottom surface of the cooking vessel 76, edge strips 522 are affixed to each vane by means of retainers 524 and screws 526. The edge strips 522 are tapered to conform to the shallow V-shaped cross-section of the bottom of the vessel 76, as can be appreciated from FIG. 7.

Figure 17:
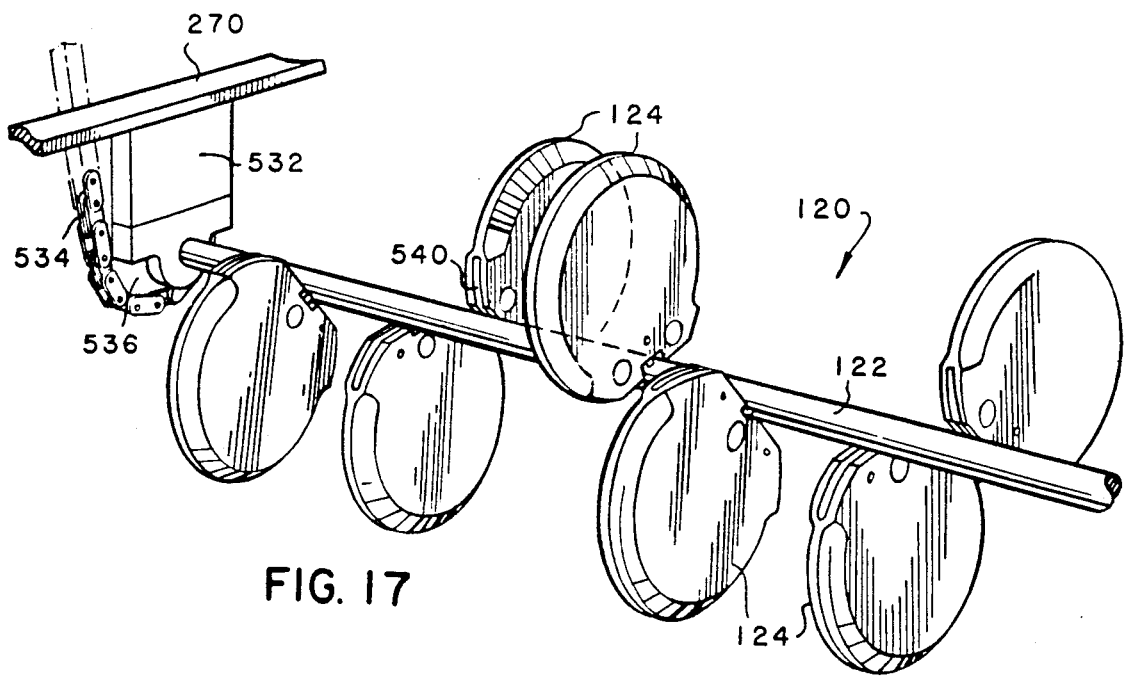
FIG. 17 is a perspective view of a portion of one of the longitudinal paddle assemblies used in the second frying zone.
Figure 18:
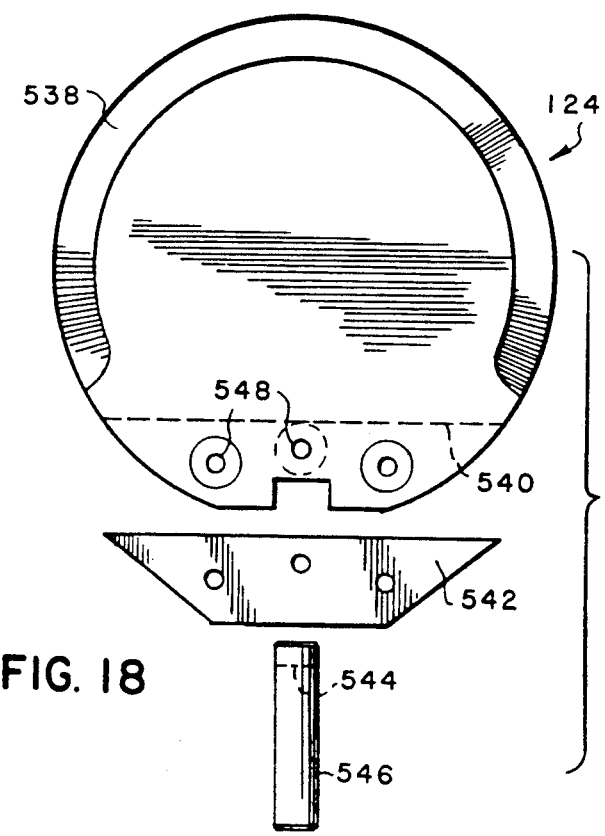
FIG. 18 is an exploded view of a single one of the longitudinal paddle assemblies.

FIGS. 17 and 18 are enlarged views illustrating the details of a portion of the longitudinal paddle assembly 120. The construction of the remaining longitudinal paddle assemblies 110-118 will be understood to be substantially identical. The paddle assembly 120 includes a central shaft 122 which is positioned longitudinally in the cooking vessel. The shaft 122 is rotatably supported at one end by means of a carrier 532 secured to the underside of the cross-member 270. At its opposite end (not shown), the shaft 122 is rotatably mounted in a similar carrier that is secured to the underside of the cross-member 278 of FIG. 10. The shaft 122 is rotated by means of a chain 534 and sprocket 536 as described previously in connection with FIG. 9. The paddle vanes 124 are affixed to the shaft 122 so that they extend radially outward from the shaft axis. Each vane 124 is separated from the next vane both angularly about the shaft axis, and axially along the length of the shaft, so that the overall arrangement of vanes 124 along the shaft 122 is helical. In the illustrated embodiment, the angle between successive vanes is 90°. When the shaft 122 is rotated, the paddle members 124 successively dip into the surface of the heated frying oil in order to provide agitation and compaction of the potato slices in the second frying zone. The helical arrangement of vanes 124 on the shaft 122 also gives rise to an augering action which meters the slices through this zone. As described previously, it is preferable to cause adjacent pairs of the longitudinal paddle assemblies to counter-rotate and interdigitate, in order to maximize the agitation and compaction of the potato slices in the second frying zone.

The augering action of the longitudinal paddle assemblies 110-120 will occur even when the vanes have no pitch relative to the axis of the shaft 122, as in the illustrated embodiment. However, it may be desirable to provide some or all of the vanes with a pitch in order to control the flow of oil and potato slices in a particular manner. Thus, for example, the pitch of the vanes 124 of the outermost paddle assemblies may be adjusted so as to counteract the tendency of the oil to flow more slowly at the edges of the vessel 76, thereby insuring that the flow rate is uniform across the width of the vessel. The pitch of the vanes 124 may also be adjusted to direct the flow of oil slightly downward, so that the potato slices do not become lodged on the supporting structures and sprockets at the ends of the paddle assembly shafts.

The detailed construction of one of the paddle vanes 124 is illustrated in the exploded view FIG. 18. The vane comprises a generally circular or disk-shaped blade 538 made of Teflon having a thickness of approximately one-half inch. The lower portion of the vane 538 is formed with an internal slot 540 which receives a blade holder 542. The lower edge of the paddle holder 542 is retained in a slot 544 formed at one end of a stem 546. A number of screws (not shown) pass through aligned holes 548, 550 formed in the blade 538 and holder 542, respectively. The stem 546 is received in a bore formed radially through the shaft 122 of the longitudinal paddle assembly 120, and is held in place by means of a set screw so that the vane can be adjusted in pitch if desired. The paddle blade 538 may be replaced, if necessary, by uncoupling it from the holder 542 and substituting a new paddle blade. Although the preferred shape of the paddle blade 538 is circular, as shown, other paddle blade shapes may be employed if desired. As an example, fan or sector-shaped paddle blades may be used, and the angle subtended by the sectors relative to the shaft 122 may be selected so that the vanes overlap each other when viewed from one end of the shaft.

FIG. 19 illustrates the manner in which the side plates 174, 176 of the frame assembly 173 are supported within the cooking vessel 76. The upper flange portion 178 of the side plate 174 is formed with a number of vertical bores. These bores are threaded to receive a corresponding number of bolts 177. The threaded portions of the bolts 177 extend through the flange 178 and rest against the drain troughs 180 which extend longitudinally along the top of the side wall 166 of the vessel 76. An identical series of bolts is provided on the opposite side of the cooking vessel 76 to support the side plate 176 with respect to the opposite side wall 168 of the vessel. These bolts carry the weight of the frame assembly 173 and the various components attached to it. If desired, the bolts may be turned in order to adjust the vertical height of the side plates 174, 176 within the vessel 76. This will have the effect of raising or lowering the drum paddles 102-108, longitudinal paddle assemblies 110-120, drum paddle 126 and submersion conveyor 128 by the same distance. This adjustment may be utilized in lieu of, or in addition to, the separate height adjustments which are provided for the individual components.

With further reference to FIG. 19, the manner in which the submersion conveyor 128 is supported with respect to the side plates 174, 176 may be more fully appreciated. As described previously in connection with FIGS. 12-14, the submersion conveyor 128 is supported between a pair of plates 408, 410 which are received between the side plates 174, 176. The upper portion of the plate 408, which includes the flange 412, is visible in FIG. 19. The bolts 450 and 452 are received in threaded bores formed in the flange 412, and extend through the flange 412 so that they are in contact with the flange 178 of the side plate 174. The second plate 410 is supported in a similar manner with respect to the opposite side plate 176. By virtue of the bolts 450, 452 and the corresponding pair of bolts on the opposite side of the frying unit 46, the height of the submersion conveyor can be adjusted independently of the other components.

Figure 20:
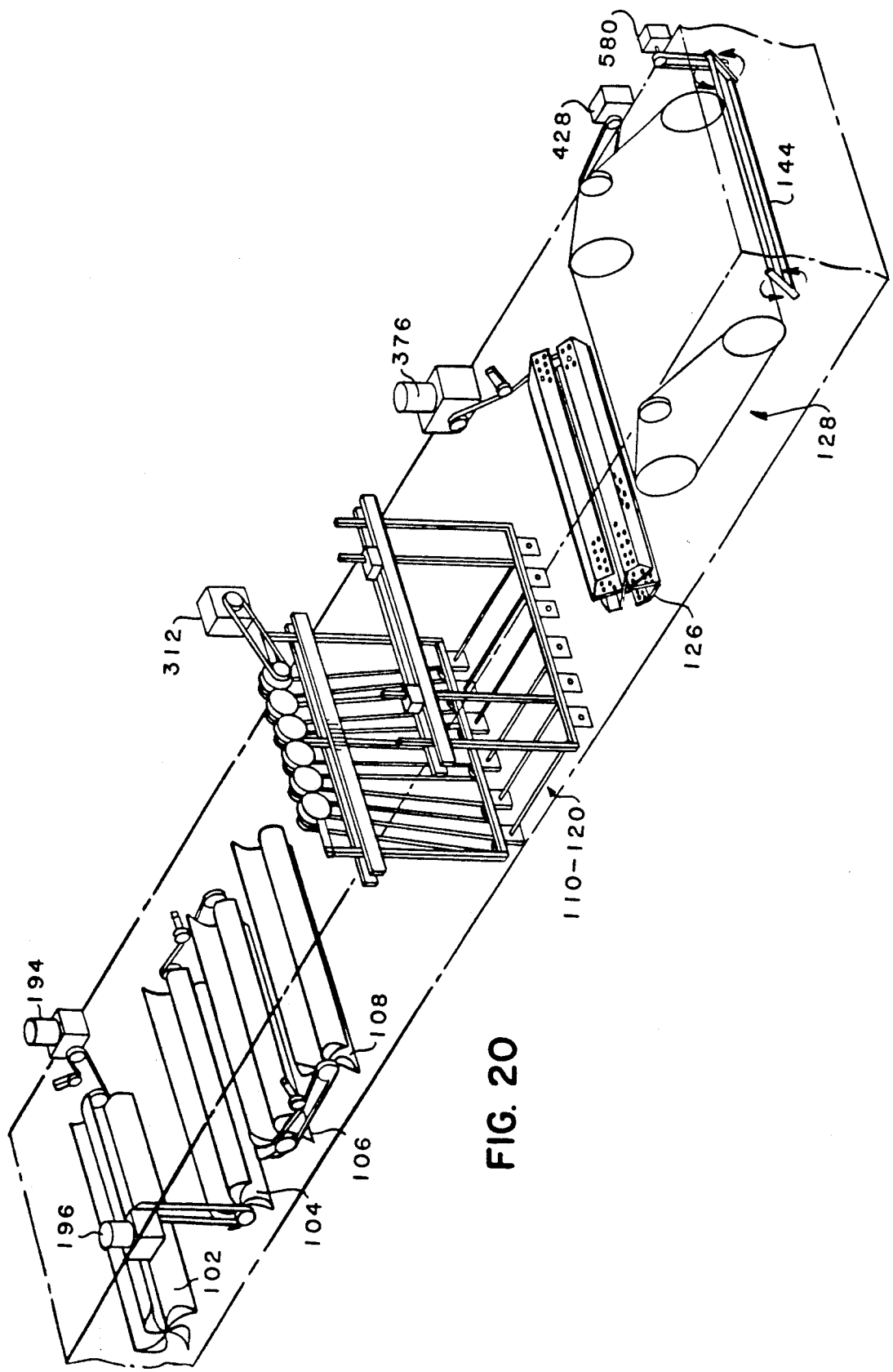
FIG. 20 is a perspective view illustrating the separate drive systems used for the various paddles and conveyors.

FIG. 20 is a perspective view which illustrates the independent drive systems used for the various components of the continuous frying unit 46. In the first frying zone, the drum paddle 102 is powered by a motor 194, while the three remaining drum paddles 104, 106 and 108 are driven by a second drive motor 196. In the second frying zone, the longitudinal paddle assemblies 110-120 are rotated in unison by a third drive motor 312, and the single drum paddle 126 is driven by a fourth motor 376. In the third and final frying zone, the submersion conveyor 128 is powered by a fifth drive motor 428, and the chip detangler is rotated by a sixth drive motor 580. Preferably, each of the drive motors 194, 196, 312, 376, 428 and 580 may be controlled independently, so that the speed of the corresponding component can be made to vary relative to the speeds of the remaining components.

Figure 21:
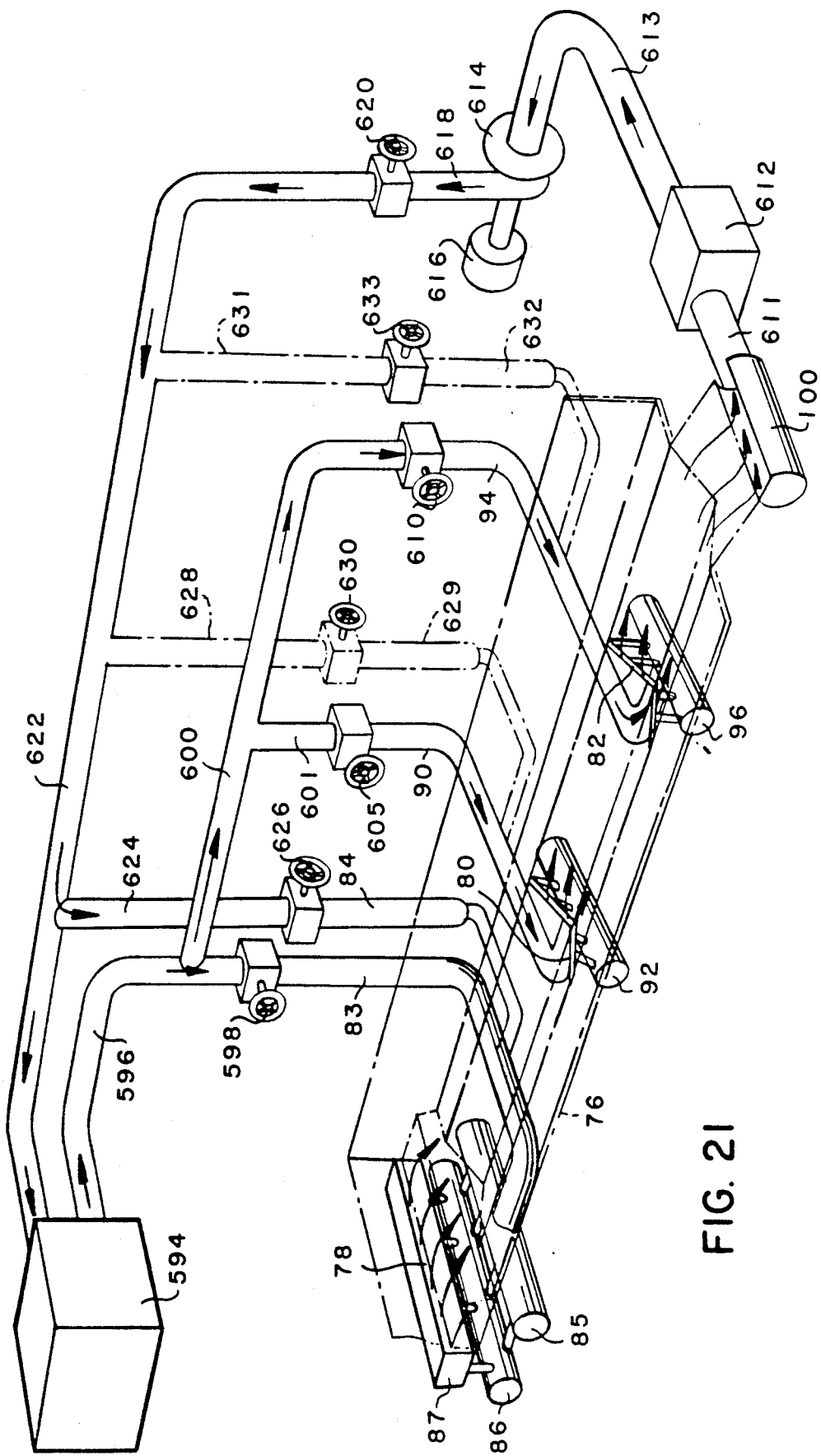
FIG. 21 is a perspective view illustrating the flow of heated frying oil through the continuous frying unit.

FIG. 21 is a perspective view which illustrates a preferred flow pattern for the heated frying oil which is circulated through the vessel 76. The frying oil is routed through a gas-fired heat exchanger 594 and is heated to a suitable temperature, typically between 300° F. (149° C.) and 340° F. (171° C.). The heated oil is passed through a pipe section 596 and valve 598, and is directed to the first oil inlet port 78 of the vessel 76 through the pipe section 83, manifolds 85, 86 and weir device 87. Some of the oil from the pipe section 596 is diverted to the second oil inlet port 80 through additional pipe sections 600, 601, and 90, and to the third oil inlet port 82 through a further pipe section 94. The valves 608 and 610 control the amount of heated oil that reaches the second and third inlet ports 80 and 82. At the exit end of the vessel 76, the oil is collected in the plenum 100 and flows through a pipe section 611 to a filter 612 which removes fines from the oil. From the filter 612, the oil flows through a further pipe section 613 to a pump 614 powered by a motor 616. From the pump 614, the oil flows through a pipe section 618, valve 620, and further pipe section 622 to the input side of the heat exchanger 594. The heat exchanger raises the temperature of the frying oil from approximately 275°-290° F. (135°-143° C.), its temperature at the exit end of the fryer, to the preferred inlet temperature about 300°-340° F. (149°-171° C.). A portion of the cooler oil flowing toward the input side of the heat exchanger 594 through the pipe section 622 is diverted through a further pipe section 624 so that it bypasses the heat exchanger. The cooler oil passes through a valve 626 and pipe section 84 and is mixed with the hotter oil entering the vessel 76 through the pipe 83. By properly adjusting the valves 598 and 626, the flow rates of the heated and non-reheated oil supplied to the first inlet port 78 may be proportioned so that the desired inlet temperature is obtained. This allows the temperature of the first frying zone to be controlled within the desired range. The temperatures of the second and third frying zones are controlled by adjusting the valves 608 and 610, respectively, to admit varying amounts of hot oil through the second and third inlet ports 80 and 82. The hot oil admitted through these inlet ports mixes with the cooler oil already in the vessel 76 to obtain the desired temperature ranges in the final two frying zones.

In a modified embodiment, illustrated in phantom lines in FIG. 21, the non-reheated oil flowing toward the input side of the heat exchanger 594 is diverted not only to the first oil inlet port 78, but also to the second and third inlet ports 80, 82. This allows greater control over the temperatures of the second and third frying zones. To this end, the pipe section 622 is connected by means of additional pipe sections 628, 629 and a valve 63, to the pipe section 90 leading to the second inlet port 80. Similarly, the pipe section 622 is connected by means of additional pipe sections 631, 632 and a valve 633 to the pipe section 94 leading to the third inlet port 82. The valves 608, 630 may be proportioned to regulate the temperature of the oil admitted through the second inlet port 80. In a similar manner, the valves 610, 633 may be proportioned to regulate the temperature of the oil admitted through the third inlet port 82. The availability of reheated and non-reheated oil at each inlet port is advantageous since, by properly proportioning the flow rates of the two streams of oil, it is possible (at least within certain limits) to vary the temperature of the incoming oil without changing the total flow rate. Since the flow rate of oil through the fryer affects the rate of potato chip production, it is desirable to maintain a constant flow rate under most circumstances.

Figure 22:
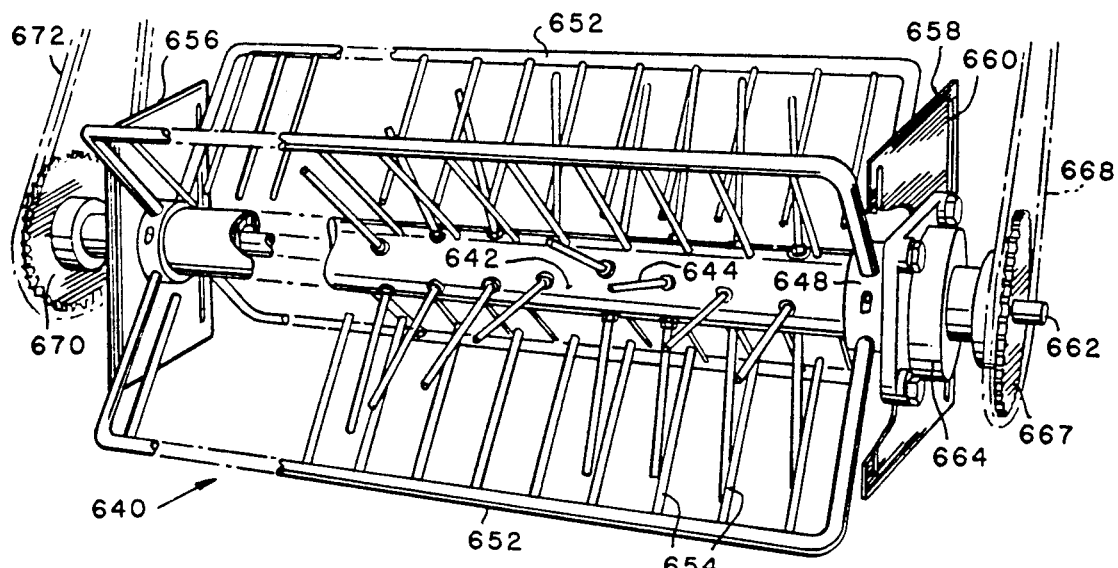
FIG. 22 is a detailed perspective view of a rotating rake device which may be employed in the continuous frying unit.

FIG. 22 is a perspective view of a rotating rake device 640 which may be employed in the continuous frying unit 46. The rake device comprises a rotatable shaft 642 which carries a number of radial spokes 644. The shaft 642 is rotatably supported at its ends by two bearing assemblies 646, 648. The bearing assemblies 646, 648 are carried by an outer frame or cage 652 which is rotatable independently of the shaft 642. The frame 652 is in coaxial or surrounding relationship with the shaft 642 and carries a number of rows of horizontally aligned spokes 654. The spokes 654 of the frame 652 extend radially inward toward the shaft 642 and are interleaved or interdigitated with respect to the spokes 644 of the shaft. The length of the spokes 654 is such that they extend to within a short distance of the shaft 642. Similarly, the length of the spokes 644 is such that they extend to within a short distance of the horizontal bars of the frame 652.

The rake device 640 is supported at both ends by a pair of mounting plates 656, 658. The mounting plates are provided with slots 660 in which bolts (not shown) may be received for affixing the rake device 640 to the side plates 174, 176 of the continuous frying unit 46. A shaft 662 carried by a bearing assembly 664 passes through the mounting plate 658 and is affixed at its outer end to sprocket 667 and at its inner end to the frame 652. A chain 668 drives the sprocket 667 from a motor (not shown) in order to rotate the frame 652 with respect to the side plates 656, 658. The shaft 642 is journalled through the mounting plate 656 and is connected to a second drive motor (not shown) by means of a sprocket 679 and chain 672.

In operation, the outer frame 652 and the inner shaft 642 may be counter-rotated relative to each other, or they may be rotated in the same direction but at different speeds. The interdigitation between the spokes 644 carried by the shaft 642 and the corresponding spokes carried by the frame 652 produces a churning or agitating effect in the frying oil which tends to prevent clustering between potato slices and to break up clusters which may have already formed. As can be seen in FIG. 22, the spokes 644 are affixed to the shaft 642 in a staggered manner with an angular spacing from one spoke to the next, rather than in straight horizontal rows. In this way, not all of the spokes 644 line up with the corresponding spokes 653 of the frame 652 at the same time. This avoids the periodic sudden increases in rotational resistance that would otherwise occur if all of the spokes 644, 654 were to align at the same time while immersed in the densely packed suspension of potato slices and frying oil. The angular pattern of spokes 644 on the shaft 642 is preferably one which is symmetrical about the midpoint of the shaft, such as a chevron-shaped pattern, in order to avoid inducing any net motion of the potato slices toward one end of the rake device 640. In embodiments where such a net motion of the potato slices is desirable, however, a directional pattern such as a continuous helix may be used for the spokes 642. It will be apparent that embodiments are also possible in which the spokes 644 carried by the shaft are aligned in horizontal rows and the spokes 653 carried by the outer frame 652 are staggered with respect to each other.

Figure 23:
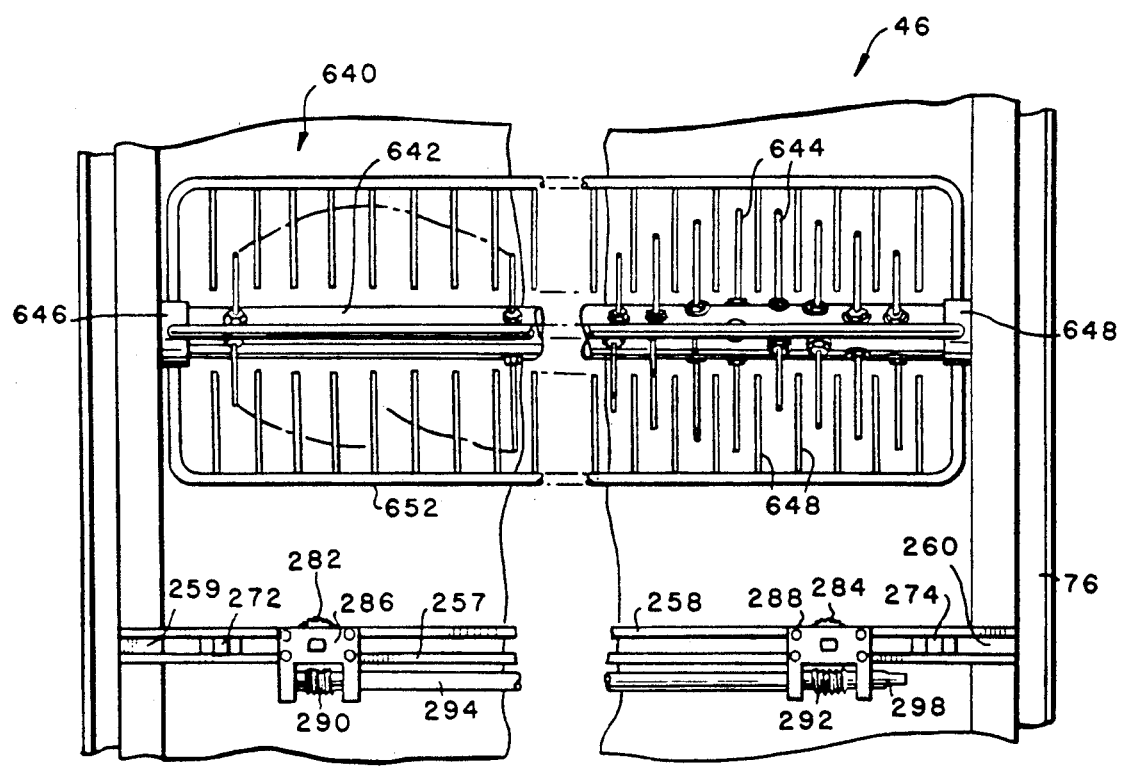
FIG. 23 is a top view of a portion of the third frying zone, illustrating the manner in which the rotating rake device may be installed.

FIG. 23 illustrates one possible position in which the rake device 640 may be installed in the continuous frying unit 46. The rake device is situated downstream of the longitudinal paddle assemblies 110-120 in the second frying zone, in place of the final drum paddle 126, and is oriented so that the shaft 642 is transverse to the direction of oil and product flow in the vessel 76. Preferably, the rake device 640 is operated so that the outer frame 652 rotates in a clockwise direction and the shaft 642 rotates in a counterclockwise direction when viewed from the right-hand side in FIG. 23. Thus, the portions of the spokes 644 which become immersed in the frying oil move in the direction of movement of the frying oil and potato slices, and the immersed portions of the frame 652 and spokes 653 move in the opposite direction. It is preferred to drive the shaft 642 at a faster speed than the frame 652. The shaft 642, frame 652, and spokes 644, 654 of the rake device 640 are preferably covered with Teflon to reduce sticking of the potato slices.

In one possible commercial embodiment, the continuous frying unit 46 of the present invention may include a vessel 76 having a length of 22 feet, 6 inches and a width of 50¾ inches. The oil depth in the vessel may be in the range from 6½ to 7¾ inches, and is preferably in the range from 7 to 7¼ inches. At this depth, the surface of the oil is just below the shafts, sprockets and chains used for the drum paddles and longitudinal paddle assemblies. The total volume of oil in the vessel is about 544 gallons, based on an oil depth of 7½ inches and with the drum paddles and longitudinal paddle assemblies in place. The shafts of the drum paddles 102-108 are positioned approximately 6½ inches above the deepest part of the vessel 76 and can be adjusted in height from 6½ inches to 8¼ inches. At the lower position, the clearance between the drum paddle vanes and the bottom of the vessel is approximately ¾ inch. The longitudinal paddle assemblies 110-120 are normally positioned with thin shafts approximately 11 inches above the deepest part of the fryer, and are adjustable in height between 7¾ inches and 24¼ inches. The paddle blades are about 5 inches long and have a minimum clearance of about 6 inches from the deepest part of the vessel when the shafts are positioned at their nominal height of 11 inches. The bottom run of the submersion conveyor 128 is about 6½ inches above the deepest part of the vessel and can be adjusted in height from 3 inches to 11½ inches. It is to be understood that the foregoing dimensions are merely exemplary and are not intended to limit the scope of the invention in any way.

During the operation of the continuous frying unit 46, potato slices are conveyed sequentially through the first, second and third frying zones while immersed in the heated liquid frying medium. The slices are preferably cut from a potato having a high dry matter (solids) content, i.e., about 15-25% by weight, preferably above about 18% and more preferably above about 20% by weight solids based on the weight of the potato (i.e., less than about 80% by weight of water). Suitable potatoes include Atlantic, Mononas, Kennebec, Pennsylvania 657, Cloverdale, New York Superior, Pennsylvania Rosa and Norchip varieties. Preferred varieties include Atlantic, Mononas, Pennsylvania 657, and Norchip varieties having a high dry matter content. Preferably, potatoes having a high sugar content such as Russets or other baking varieties are not used because the chips which result have an undesirably dark color.

The potatoes used in the process and apparatus of this invention are subjected to a series of conventional preparatory steps which are not part of this invention. Prior to entry into the fryer, the potatoes must be washed, peeled and sliced, and the slices again washed to remove surface starch.

Washing and peeling may be performed by any method commonly used in the art. For example, the potatoes may be washed in cold water and peeled by contact with a mechanical peeler which is a large cylinder comprised of rotating rollers, wherein the rollers are covered with an abrasive material capable of removing the potato skin from the potato.

The washed and peeled potatoes are then conveyed to a slicing station 38 where they are sliced to a desired thickness using, for example, an Urschel variable thickness slicer. The potatoes are sliced to a thickness in the range of about 0.068 inches to about 0.075 inches, and preferably about 0.070 inches thickness. The precise thickness used is a function of the solids content of the potatoes. If the solids content is low, slices at the upper end of this range are used; if the solids content is higher, slightly thinner slices may be used.

Before introduction to the fryer, the slices are subjected to a further washing step to remove surface starch therefrom. If the slices are not washed at this point, as much as 30% sticking and clumping occurs between slices as they are fried. The washing step may be performed by tumbling the slices in a perforated drum slice washer 40 while spraying water from beneath the drum for a short period of time, e.g., 30 to 40 seconds. After washing, the slices may travel to the fryer on a conveyor 42 where they are subjected to an air knife 43 which blows off excess water.

The washed, uncooked (i.e., raw or blanched in accordance with methods known in the art) potato slices are now fed into the entrance end 44 of the elongated fryer vessel and into the first frying zone. The fryer holds a bath of liquid frying medium, specifically oil or other fat suitable for frying. The frying fat may be liquid or solid at room temperature, may be of animal or vegetable origin and may be partially hydrogenated. It is preferred to use at least a portion of oil which is hydrogenated to obtain a desirable "waxy" mouth feel on the chips resulting from the solidification of the fat at room temperature. Use of hydrogenated fat also prevents seepage of liquid oil in the packaged product. Suitable frying fats and oils include lard, cottonseed oil, soybean oil, corn oil, peanut oil, palm oil, palmolein (i.e., the liquid fraction of palm oil), hydrogenated derivatives of these, and mixtures of these. Preferred oils include blends of partially hydrogenated cottonseed oil and palmolein or corn oil. A particularly preferred oil is a 50:50 blend of partially hydrogenated cottonseed oil and palmolein.

As detailed above, streams of cooking oil are admitted at a plurality of oil inlet ports along the length of the fryer vessel, the ports defining various frying zones. The oil which is supplied to these ports is heated remotely by recirculation through a heat exchanger 594, for example, a gas fired boiler, where it is heated to a temperature between about 300° F. (149° C.) and about 340° F. (171° C.), and preferably between about 315° F. (157° C.) and about 320° F. (160° C.). By "heated remotely" is meant that the heating of the oil occurs outside of the body of the fryer vessel, as distinguished from direct heating of the oil in the vessel by applying heat to the bottom of the vessel. Preferably, the oil circulates through a heat exchanger located external to the vessel.

As shown in FIG. 21, in a preferred embodiment, a portion of the oil going into the first, second or third oil inlet ports 78, 80 and 82 bypasses the heat exchanger and is recirculated directly to the fryer without being reheated. This feature allows for the establishment of a specific temperature profile necessary to produce a desired product having a well-defined taste and texture. This profile effect will be discussed in detail below. A further advantage offered by the provision of non-reheated oil to each of the three oil inlet ports is flow rate control. That is, a fixed quantity of oil can be admitted at each port without fixing the temperature of the oil if the relative proportions of reheated non-reheated oil may be varied.

Specifically, oil is supplied to three ports 78, 80 and 82: the first port at the entrance end of the fryer, and the remaining two ports approximately one-third and two-thirds of the way down the length of the fryer, respectively. The precise locations of these ports are shown in FIGS. 3 and 21 and serve to define three distinct frying zones in which the slices are subjected to different thermal and physical conditions to obtain specific desired effects.

The first frying zone is defined as the zone between the first and second oil inlet ports. As uncooked potato slices containing between about 75% and about 85% by weight of moisture (i.e., water) are fed into this zone, the slices are denser than the frying oil (due to their high water content) and sink to the bottom of the frying vessel. For this reason, the floor of the vessel below the entrance end 44 of the fryer optionally comprises a false bottom 88 which serves to reduce the oil depth and increase its velocity thereby preventing sticking of the dense, starchy slices. Drum paddles 102-108 are situated in this zone. Typically, the first (upstream) of these paddles rotates at a higher rate of speed than the subsequent paddles to achieve a sweeping or scooping action. The remaining (downstream) paddles serve to create turbulence and to agitate the slices while frying is occurring. Also, the forward rotation of the paddles serves to advance the slices in the direction of the oil flow. Preferably, the first paddle 102 rotates at from about 3.5 to about 13.5 seconds per revolution and the subsequent paddles 104-108 rotate at from about 39 to about 72 seconds per revolution.

The blades 506 of these paddles are made of polytetrafluoroethylene (Teflon) to prevent partially fried starchy slices from sticking to the blades in the first frying zone. Paddles 104-108 are situated close to the floor of the vessel (i.e., about ¼" to about 1", and preferably about ¾" therefrom) to prevent slices from leaving the first frying zone prematurely by slipping under the paddles. The paddles are preferably perforated so as not to obstruct oil flow through this zone.

While in the first frying zone, a large portion of the water in the raw potato slices is boiled out, making the slices relatively less dense and tending to be more buoyant in the oil. When raw slices enter the fryer, they are rigid from turgor. By the time the slices leave this zone, they are soft and limp, have an oily film surface, and a white to light yellow color. The moisture content of the slices as they leave this zone has decreased from within a range from about 75% to about 85% (uncooked slices) to within a range from about 35% to about 45% and preferably about 38% to about 42% by weight.

The drum paddles have the additional function of metering the flow of slices out of this first frying zone into the second frying zone (i.e., controlling the residence time in the first frying zone), such that their water content and degree of fry are at suitable levels for the actions of the second zone.

The second frying zone of the vessel is defined as being the area between the second and the third oil inlet ports. As the slices are conveyed through this zone, they continue to lose water and take on a more malleable, pliable, shape-holding consistency. In this zone the chips become more densely packed (e.g., by a factor of about two relative to their level of compaction in the first frying zone) and are, in a preferred embodiment, subjected to the compacting and agitating forces of the longitudinally arranged paddle assemblies 110-120. These longitudinal paddle assemblies are arranged in interdigitating, counter-rotating pairs. There may be from two to twelve or more pairs of these paddle assemblies, depending on the width of the fryer. Typically, there are from two to six pairs.

In this zone, the chips lose enough moisture so as to be shapeable under the compacting forces applied by these paddle assemblies. By the time the slices leave this zone, they are capable of holding the shape imposed on them. The paddles in this region perform an auger-like function and have the unique capability of both compacting the slices by the downward pushing of the paddles against the oil surface and by the folding of individual slices around individual paddle vanes 124, and agitating to prevent agglomeration of the slices. It is this capability which allows folded but nonagglomerated slices to be formed.

Conditions in the second frying zone such as paddle assembly speed, degree of compaction and residence time are set to produce desired proportions of folded and unfolded chips in the final yield. These conditions can be set to obtain any desired proportion of completely folded chips from about 5% to about 70% or more by weight. "Completely folded" chips are defined as chips having the two sides thereof in actual contact with one another. In one preferred embodiment, less than about 5% by weight of the chips are completely folded. In another preferred embodiment, the proportion of completely folded chips is between about 30% and about 70%, and more preferably between about 40% and about 60% by weight, based on the total weight of chips yielded. It is generally not desirable to have more than 60% by weight of completely folded chips, from the standpoint of lowered package volume per unit weight.

The slices are maintained in this second frying zone for a period of time sufficient to produce slices which are fairly pliable and springy and are capable of holding a shape imposed by mechanical forces. Their moisture content has decreased significantly, to between about 5% and about 15%, preferably about 8% and 12%, based on total slice weight. Because of the low moisture content, the slices are quite buoyant by the time they leave the second frying zone.

A final drum paddle 126 is preferably located at the end of the second frying zone to meter movement out of the second zone and into the third zone. Without this metering effect, flow of slices out of the second frying zone would be discontinuous, residence times would vary greatly, and uneven frying of slices would occur. This paddle rotates at a speed of between about 25 and about 45 seconds per revolution.

In one embodiment, a rotating rake device 640 as shown in FIGS. 22 and 23 may be used in lieu of final drum paddle 126 to perform this metering function. This rake device comprises two rakes, an inner and an outer rake, preferably operating at different rates, the inner rake typically operating in the range of between about 3.3 and about 4.8 seconds per revolution and the outer rake typically at between about 7 and about 12 seconds per revolution.

In another embodiment, a rotating rake device 640 may be used in lieu of the paddle assemblies 110-120 to perform the functions of compacting and agitating. In this embodiment, the inner and outer rakes again operate in the range of between about 3.3 and about 4.8 seconds per revolution and between about 7 and about 12 seconds per revolution, respectively.

The third oil inlet port 82 is disposed at the beginning of the area below submersion conveyor 128, and the third frying zone is therefore defined as the area between this third port and the end of the fryer. As described above, the slices are low enough in moisture to be buoyant when they enter the third frying zone; the submersion conveyor therefore operates to retain the chips below the oil surface for a time sufficient to obtain completely fried potato slices having a final moisture content of below about 3% by weight, and preferably about 1 to about 2% by weight. If the moisture content of the finished chips is appreciably higher than about 2%, the chips will not be as crisp and will become stale after an unacceptably brief period of time. If the moisture content is lower than about 1%, no further incremental advantage is attained to offset the additional expenditure of energy, and the chips may have an increased oily taste or feel, and may taste burned or scorched. Preferably, the bottom run of the submersion conveyor is adjusted to be just at the oil surface to maximize the volume which the slices and oil may occupy to minimize breakage of the now-brittle slices.

An important feature of the present invention is the temperature profile characterizing the various zones of the process and apparatus of the invention. This feature is distinct from conventional continuous fryers wherein the temperature profile from entry of potato slices to exit of completely fried slices or chips is either descending or, in some cases, isothermal. In contrast, the present process is characterized by a temperature profile wherein the temperature initially drops as uncooked potato slices and either reheated oil only or a mixture of reheated and non-reheated oil are added at the entrance end of the vessel, and subsequently rises as reheated oil or a mixture of reheated and non-reheated oil is introduced at subsequent points along the fryer.

At the beginning of the first frying zone, either reheated oil only or a mixture of reheated and non-reheated oil is admitted through the first oil inlet port. By "reheated oil" is meant oil having gone from the exit end of the fryer (or, alternately, from any outlet point in the fryer) through the heat exchanger and back into the first frying zone and having a temperature typically in the range of between about 300° F. (149° C.) and about 340° F. (171° C.). By "non-reheated oil" is meant oil withdrawn from the exit end of the fryer and fed directly to the first frying zone without having gone through the heat exchanger and having a temperature in the range of between about 270° F. (132° C.) and about 285° F. (141° C.). The net effect is a maximum temperature in the first frying zone of up to about 290° F. (143° C.). At no time during the frying process does the temperature exceed about 300° F. (149° C.), and preferably does not exceed about 290° F. (143° C.).

The first frying zone is characterized by a rapid drop in temperature as heat is used to vaporize water from the highly moist uncooked slices. Toward the end of this zone, the temperature of the oil containing the slices has fallen to within the range of between about 220° F. (104° C.) and about 270° F. (132° C.).

At the beginning of the second frying zone, reheated oil (i.e., having a temperature in the range of between about 300° F. (149° C.) and about 340° F. (171° C.)) is admitted to the fryer. In an alternate embodiment, a mixture of reheated and non-reheated oil may be admitted to this zone as in the first frying zone. When this oil mixes with the slice-containing oil, a maximum temperature in the range of between about 240° F. (116° C.) and about 285° F. (141° C.) is eventually attained. Moving through the second frying zone, the temperature of the slice-containing oil falls to a temperature within the range of between about 240° F. (116° C.) and about 275° F. (135° C.).

At the beginning of the third frying zone, reheated oil is again introduced to the fryer and a maximum temperature for this zone of between about 275° F. (135° C.) and about 290° F. (143° C.) is eventually attained. In an alternate embodiment, a mixture of reheated and non-reheated oil may be admitted to this zone as in the first frying zone. Because the amount of heat used to vaporize the moisture content of the slices is less significant in this zone inasmuch as most of the moisture is now removed from the potato slices, the minimum temperature in the third frying zone falls only to within the range of between about 270° F. (132° C.) and about 285° F. (141° C.).

Thus, the net effect is a temperature profile which is characterized by an initial fall followed by a recovery and eventual rise in temperature. This unique temperature profile is obtained by the unique combination in the present invention of multiple oil inlet ports and the concept of causing a portion of oil to bypass the heat exchanger such that cooler oil (i.e., having a temperature of between about 270° F. and about 285° F., or between 132° C. and 141° C.) will be added to one or more of the zones. These features afford a degree of control of individual temperatures in the various frying zones which would not otherwise be possible.

While it is not desired to be bound by any particular theory, it is believed that the present process is uniquely effective in producing distinctive "kettle style" potato chips because this temperature profile approximates the profile at which slices are cooked in a batch type kettle apparatus. In the kettle method, oil is heated in the kettle. When cold, high moisture potato slices are added to the oil, the temperature of the oil falls rapidly as heat energy is used to heat the slices to the boiling point of water and then to evaporate water from the slices. As frying proceeds, the amount of residual water and thus the rate of evaporation decreases such that the oil, which in the case of the kettle process is continuously being heated from an external heat source, gradually recovers its high initial temperature, so that frying is completed at this higher temperature. This temperature profile, marked by a drop in temperature followed by a rise, has been successfully duplicated by the process and apparatus of the present invention.

After frying is completed, the slices, now rigid and brittle and having a moisture (water) content below about 3%, and preferably between about 1% and about 2%, are removed from the liquid frying medium and travel from the submersion conveyor 128 onto a take-out conveyor 54, through which nonabsorbed oil drips off, and is returned to the cooking vessel 76 below. Optionally, a chip detangler 144 impacts the slices as they leave the submersion conveyor to agitate and dislodge any chips which may have become entangled without breaking the now rigid chips. The drained chips are then optionally seasoned with, for example, salt, or other seasonings or flavorings. The seasoned chips are then packaged by methods known in the art.

The chips which are produced are distinctive in texture, color, mouth feel, and general taste from "conventional" continuously fried potato chips. The chips are notably harder in texture, have an oilier mouth feel (because a relatively high percentage of the oil resides on the surface of the chip), and are typically lighter in color. Optionally, the chips can be made to have a high proportion of completely folded chips per batch. In a preferred embodiment, where a blend containing hydrogenated oil is used, a "waxy" mouth feel is obtained because the hydrogenated portion of the oil solidifies on the chips' surfaces at room temperature.

In another embodiment, the invention relates to a method for operating a single continuous frying apparatus to either produce conventional high temperature-fried chips, or, alternately, to produce kettle style potato chips. Several conversions can be made to the apparatus of the present invention, which has been described as an apparatus designed to prepare low temperature-fried chips in a liquid frying medium at a distinct temperature profile, to make an apparatus capable of making high temperature-fried potato chips in a process having a descending or isothermal temperature profile. Conversely, the fryer can easily be converted back to one capable of making kettle style, low temperature-fried chips. Thus, the fryer is flexible in the sense that it can adapt to making different varieties of chips dependent on demand, and economical in the sense that one fryer is capable of producing both varieties of chips. In order to convert from a conventional chip-type fryer to a kettle style chip-type fryer, several adjustable features are incorporated into the design of the apparatus.

One adjustable feature is the positioning of the submersion conveyor 128 relative to the oil surface. In a conventional frying process, it is desirable to position the submersion conveyor such that its bottom run is well below the surface of the oil, insuring more complete immersion of the slices in the oil. In the kettle style chip process, the bottom run of the submersion conveyor may be situated just at the surface of the oil to allow potato slices to occupy the entire volume of oil below the submersion conveyor to minimize any agglomeration or sticking of slices. Additionally, the position of the submersion conveyor may be changed to conform to changes in oil level, for instance in the case where smaller yields are to be produced.

Another convertible feature is the speed and positioning of the interdigitating counter-rotating paddle assemblies 110-120. These paddle assemblies are only necessary in order to produce folded kettle style chips. If it is desired to produce conventional, unfolded potato chips or unfolded kettle style chips, the section of paddle assemblies can be elevated relative to the surface of the oil to minimize their compacting function. When it is desired to make conventional potato chips, the paddle assemblies may be sped up to increase their throughput rate in this relatively faster and hotter frying process. Also, the pitch of these paddle assemblies may be adjusted in order to direct the flow of slices and oil through the second frying zone.

Further, the temperature profile of the frying process may be adjusted to produce either conventional or kettle style chips. The descending/ascending temperature profile in the kettle style chip process is attained by the introduction of hot oil at various points 78, 80 and 82 along the length of the fryer, and by introduction of a mixture of reheated oil and non-reheated oil into the first and/or second and/or third oil inlet ports 78, 80 and 82. The descending or isothermal temperature profiles used in making conventional potato chips may be achieved by closing off second and third oil inlet ports 80 and 82, and by blocking the entrance of non-reheated oil into the first frying zone through valve 626. Heat exchanger 594 is adjusted such that oil is heated to a temperature suitable for fast frying associated with conventional potato chip frying processes, i.e., between about 300° F. (149° C.) and about 360° F. (about 182° C.) and preferably between about 340° F. (about 171° C.) and about 350° F. (about 177° C.).

Other adjustable features of the apparatus which render it suitable for alternately producing both kettle style and conventional chips include provisions for adjusting drum paddle speeds and longitudinal paddle assemblies and for adjusting slice thicknesses.

High temperature-fried conventional potato chips are typically conveyed through the frying oil at a faster rate of speed. Kettle style chips dwell in the fryer for about seven to twelve minutes, whereas conventional chips are fried for about three to four minutes. This faster conveyance may be effected by increasing the speed of drum paddles 102-108 and of paddle assemblies 110-120.

Conventional chips are somewhat thinner than kettle style chips. The thinner slices used may be made by setting the variable thickness slicer to cut potato slices having a thickness in the range of between about 0.057 inches and about 0.062 inches, rather than in the range of between about 0.068 inches and about 0.075 inches used in preparing kettle style chips.

Furthermore, various modifications to the process of the present invention may be made to effect any desired temperature profile. As an example, a low temperature profile may be effected by injecting a relatively high proportion of non-reheated oil at each oil inlet port to produce especially hard potato chips. As a further example, to approximate a continuously ascending temperature profile, a profile having a relatively small drop in temperature before the ascending portion of the profile can be effected by injecting a particularly high proportion of non-reheated oil at the first oil inlet port.

The present invention may be further understood by reference to the following Examples which are meant to be illustrative and are not to be construed as limiting the scope of the instant invention as defined in the appended claims. The following Examples were conducted on a prototype fryer which has the same basic mode of operation as the commercial scale fryer shown in the drawings and described herein. However, various modifications to the structure shown and described herein exist and the essential features of the fryer used in each Example are set forth in the beginning of that Example. All parts and percentages are to be construed as by weight and all temperatures as degrees Farenheit unless otherwise specified.

EXAMPLE 1

A frying vessel whose internal dimensions were about 21 feet long and about 20 inches wide and which included the following sequence of elements was used: (1) three perforated metal drum paddles positioned similarly to drum paddles 102-108 shown in the drawings and capable of rotating at different speeds; (2) one counter-rotating pair of longitudinal paddle assemblies similar to paddles 110-120 shown in the drawings and capable of upward and downward adjustment at each end relative to the floor of the vessel; (3) a fourth drum paddle; (4) a height adjustable submersion conveyor; (5) a chip detangler consisting of a pair of spaced-apart bars; and (6) a take-out conveyor. A false bottom as depicted in the drawings was not included. The apparatus also had six temperature probes located at the following points: (i) at a point immediately following the slice input end of the fryer; (ii) at a point approximately halfway through the first frying zone; (iii) at a point immediately following the second oil inlet port; (iv) at a point approximately halfway through the second frying zone; (v) at the point just before the third oil inlet port; and (vi) at the exit end of the third frying zone.

N.D. Norchip potatoes containing 22.0% dry matter which had been previously washed and peeled were fed to an Urschel slicer set at 0.074 inches and slices 0.0725 inches thick were obtained. The slices were washed and fed (raw feed setting=61) into the entrance end of the frying vessel. The vessel contained a 50:50 blend of partially hydrogenated cottonseed oil and palmolein having an average depth of 7.75 inches. The oil was continuously recycled by removing and recycling oil from the take-out end of the apparatus to the three oil inlet ports through a gas boiler heat exchanger set at 310° F./300° F. (output/input temperature ratio). The drum paddles in the first frying zone were synchronized to 14.0 seconds per revolution, the longitudinal paddle assemblies were set at 13.1 seconds per revolution, the drum paddle following the longitudinal paddle assemblies at 44.0 seconds per revolution, the submersion conveyor at 2.4 feet per minute, the chip detangler at 1 second per revolution and the take-out conveyor at 2.3 feet per minute.

The following temperature readings were taken at each of the six probes: (i) 291° F.; (ii) 278° F.; (iii) 263° F.; (iv) 268° F.; (v) 267° F.; and (vi) 285° F. A yield of 285 pounds of chips per hour was obtained, and the resulting batch of chips contained 43.1% by weight folded chips, 1.3% by weight double chips, no triple chips and no clusters. The chips had good texture, slightly dark color, 2.3% by weight moisture, and 32.2% by weight oil.

EXAMPLE 2

The procedure of Example 1 was substantially duplicated, and the apparatus was substantially identical, except in the following details. Pennsylvania Monona potatoes having 20.6% dry matter were used. The slicer was set at 0.070 inches. The potatoes were fed at a raw feed rate of 62. The following paddle settings were used: first drum paddle: 14.0 seconds per revolution; second and third drum paddles: 58.0 seconds per revolution; paddle assemblies: 7.7 seconds per revolution; drum paddle following paddle assemblies: 26.0 seconds per revolution; submersion conveyor: 2.9 feet per minute; chip detangler: 1.0 second per revolution; and take-out conveyor: 2.3 feet per minute. The heat exchanger was set at 310° F./300° F. (output/input temperature ratio) and the following temperature profile measured at the six probes (i) through (vi): (i) 290° F.; (ii) 274° F.; (iii) 260° F.; (iv) 277° F.; (v) 272° F.; and (vi) 286° F. The run produced a yield of 248 pounds per hour having 30.1% by weight folded chips; 1.0% by weight doubles; no triples and no clusters. The chips had a water content of 1.8% by weight and oil content of 35.1% by weight.

EXAMPLE 3

The procedure of Example 2 was repeated except that the speed of the paddle assemblies was decreased to 8.3 seconds per revolution. The following temperature profile was observed: (i) 290° F.; (ii) 278° F.; (iii) 265° F.; (iv) 274° F.; (v) 273° F.; and (vi) 288° F. This protocol yielded 270 pounds per hour of chips having 1.2% water and 36.6% oil. 0.9% by weight doubles were counted and 31.0% by weight folds, indicating that, when the temperature in the first frying zone is relatively high, the slices become fixed in shape before reaching the second frying zone and thus the action of the longitudinal paddle assemblies will not appreciably effect the amount of folding.

EXAMPLE 4

The procedure of Example 2 was again substantially repeated except that the speed of the submersion conveyor was increased to 3.1 feet per minute. The following temperature profile was attained: (i) 284° F.; (ii) 272° F.; (iii) 265° F.; (iv) 275° F.; (v) 275° F.; and (vi) 287° F. The run produced a yield of 240 pounds per hour. 40.3% by weight of the chips were folded, 2.6% by weight were doubles, and none were triples or clusters. The chips contained 1.4% by weight water and 35.5% by weight oil.

EXAMPLE 5

The apparatus described in Example 1 was again used, except that a false bottom was added to the entrance end of first frying zone, to increase oil velocity. Also, the first three drum paddles and the longitudinal paddle assembly blades were of Teflon.

The process of Example 1 was again repeated, except for the following details. Monona potatoes having 18.8% dry matter were sliced and fed into the oil at a raw feed rate of 64. The first drum paddle was set at 3.5 seconds per revolution, the second and third drum paddles at 77.5 seconds per revolution, the paddle assemblies at 9.5 seconds per revolution, the drum paddle after the paddle assemblies at 31.0 seconds per revolution, the submersion conveyor at 2.9 feet per minute, the chip detangler at 1.0 second per revolution and the take-out conveyor at 2.3 feet per minute. The heat exchanger was set at 310°/300° F. (output/input temperature ratio). The temperature profile was as follows: (i) 288° F.; (ii) 273° F.; (iii) 260° F.; (iv) 270° F.; (v) 270° F.; and (vi) 285° F. A yield of 250 pounds per hour was obtained which contained 14.9% by weight folded chips and no doubles, triples or clusters. The chips had a water content of 2.2% by weight and an oil content of 33.8% by weight.

EXAMPLE 6

The procedure of Example 5 was again followed, except for the following changes. A blend of 50% corn oil and 50% hydrogenated cottonseed oil was used. Pennsylvania 657 potatoes having a dry matter content of 17.8%, were sliced on an Urschel slicer set at 0.073 inches to obtain an actual slice thickness of 0.0719 inches. The heat exchanger was set at 315° F. A raw feed rate setting of 62 was used. The settings of the paddles were the same as in Example 5 except that the second and third paddles were set at 0, the paddle assemblies were set at 8.3 seconds per revolution, and the take-out conveyor at 1.7 feet per minute.

The following temperature profile was observed: (i) 292° F.; (ii) 277° F.; (iii) 258° F.; (iv) 270° F.; (v) 271° F.; and (vi) 289° F. A yield of 250 pounds per hour was obtained which had 44.3% by weight folded chips.

EXAMPLE 7

The procedure of Example 6 was substantially repeated except that a blend of 75% palmolein and 25% liquid cottonseed oil was used. The take-out conveyor was set at 1 foot per minute. The temperature profile was as follows: (i) 292° F.; (ii) 279° F.; (iii) 261° F.; (iv) 277° F.; (v) 273° F.; and (vi) 290° F. A yield of 225 pounds per hour was obtained; 56.3% by weight of the chips yielded were folded.

EXAMPLE 8

The following Example was conducted to demonstrate the function of the paddle assemblies in producing folded chips. Pennsylvania Atlantic potatoes containing 25.0% dry matter were fed (raw feed=45) to an Urschel slicer set at 0.072 inches. The fryer comprised six drum paddles rotating at different speeds and positioned such that their lowest point was about 1 to 1½ inches from the floor of the fryer and a submersion conveyor. No longitudinal paddle assemblies were used. Paddles 1 and 2 were rotated at 51 seconds per revolution; paddle 3 at 44 seconds per revolution; paddle 4 at 46 seconds per revolution; paddles 5 and 6 at 140 seconds per revolution. The slices were fed into oil about 6.75 inches deep. The oil fed through the second and third oil inlets was circulated through the heat exchanger operating at 298°/277° F. (output/input temperature ratio). Non-reheated recycled oil was fed through the first oil inlet. The following temperature readings were taken at sequential points along the length of the fryer: 276° F; 280° F.; 278° F. and 285° F. A sweet potato slice was used as a "marker" to time the progression of slices down the length of the fryer. The slice appeared between the first and second paddles at 45 seconds, between the third and fourth paddles at 2 minutes, between the fourth and fifth paddles at 3 minutes, between the fifth and sixth paddles at 4 minutes, before the submersion conveyor at 6 minutes and out of the fryer at between 10 and 11 minutes. The chips which resulted had a good appearance, taste and texture; a water content of 1.6% by weight, an oil content of 32.9% by weight and contained no folded chips.

EXAMPLE 9

An apparatus having four consecutive drum paddles, a set of Teflon-coated rakes, a submersion conveyor and a take-out conveyor was used. The set of rakes comprised an inside rake running at about 5 seconds per revolution and an outside rake running at about 30 seconds per revolution, both rakes rotating in the same (forward) direction. The four drum paddles were run at about 210 seconds per revolution, about 210 seconds per revolution, about 40 seconds per revolution, and about 40 seconds per revolution, respectively. The submersion conveyor was run at 0.9 feet per minute and the take-out conveyor at 1.7 feet per minute. Pennsylvania 657 potatoes having 18.8% dry matter were sliced with an Urschel slicer set at 0.074 inches (actual slice thickness 0.0723 inches). The slices were fed at a raw feed of 58 into the apparatus. A mixture of non-reheated and reheated oil was fed to a first oil inlet; reheated oil only was fed to second and third oil inlets. A heat exchanger was set at 305° F./290° F. (output/input temperature ratio). The following temperature profile was observed at six probes, spaced as in Example 1: (i) 264° F.; (ii) 264° F.; (iii) 256° F.; (iv) 270° F.; (v) 266° F.; and (vi) 274° F. A sample was collected which had 43.2% by weight folds, 11.7% by weight clusters, 3.5% by weight water and 32.9% by weight oil.

EXAMPLE 10

An apparatus having the following sequence of paddles was used: a perforated blade paddle; two perforated bent paddles; a set of longitudinal paddle assemblies like those of Example 1; coaxially rotating rakes; a submersion converyor; a chip detangler and a take-out conveyor. A heat exchanger set at 315° F./295° F. (output/input temperature ratio) was used. A mixture of reheated and non-reheated oil was fed into the first oil inlet. Reheated oil only was fed into the second and third inlets. Pennsylvania 657 potatoes having 18.3% dry matter were sliced using an Urschel slicer set at 0.075 inches and fed to the inlet end of the above apparatus. The blade paddle was run at 13 seconds per revolution the bent paddles at 39 seconds per revolution, the paddle assemblies at 26 seconds per revolution, the inner rake at 4.8 seconds per revolution, the outer rake at 12 seconds per revolution, the submersion conveyor at 1.4 feet per minute, the chip detangler at about 1 second per revolution and the take-out conveyor at 2.3 feet per minute. The following temperature profile was observed at the six probe locations described in Example 1: (i) 274° F.; (ii) 268° F.; (iii) 256° F.; (iv) 272° F.; (v) 266° F.; and (vi) 279° F. Residence times in various zones of the fryer were measured by tracking the progress of sweet potato slices as discussed in Example 8. Six sweet potato slices had an average dwell time from entrance into the fryer to the rakes of about 3.5 minutes. Nine slices had an average dwell time from entrance to take-out of about 7.4 minutes. A sample was collected from the 258 lb. per hour yield which contained 42.9% by weight folded chips; 1.9% by weight doubles; 1.7% by weight triples, and no clusters. The chips had a water content of 1.4% by weight and oil content of 37.4% by weight.

EXAMPLE 11

The process of Example 7 was repeated except that Pennsylvania 657 potatoes having 18.8% dry matter were sliced to 0.075 inches thickness and fed at a raw fed of 62 into oil 7.75 inches deep. Three drum paddles were set at 13.7 seconds per revolution, 72 seconds per revolution and 72 seconds per revolution, respectively. Paddle assemblies were rotated at 8 seconds per revolution and the final drum paddle at 32 seconds per revolution. A submersion conveyor was operated at 2.9 feet per minute, a chip detangler at 1 second per revolution and take-out conveyor at 2.3 feet per minute. The heat exchanger was operated at 310° F./300° F. (output/input temperature ratio). The following temperature profile was observed at the six probes described in Example 1: (i) 285° F.; (ii) 272° F.; (iii) 258° F.; (iv) 272° F.; (v) 270° F.; and (vi) 286° F. A sample was collected having 43.1% by weight folded chips, 1.3% by weight doubles and no clusters or triplets. The chips contained 1.5% by weight water and 35.1% by weight oil and had a good texture.

EXAMPLE 12

The process of Example 11 was repeated except that the speed of the longitudinal paddle assemblies was increased to 6.7 seconds per revolution and the heat exchanger setting raised to 320° F./310° F. (output/input temperature ratio). Pennsylvania 657 potatoes having 19.7% dry matter were fed to the fryer and the following temperature profile was observed: (i) 297° F.; (ii) 283° F.; (iii) 270° F.; (iv) 281° F.; and (vi) 297° F.

36.0% by weight of the potato chips which were made were folded. The chips had a water content of 1.8% by weight, oil content of 36.9% by weight, no doubles, triples or clusters, but were less hard in texture than is generally acceptable for a kettle style chip.

EXAMPLE 13

The following Example was run to demonstration production of potato chips having a low percentage of folds in a fryer having longitudinal paddle assemblies. The fryer described in Example 7 was again used except the entrance end of the paddle assemblies was raised by 2¼" and the exit end by 1½". A 50:50 blend of hydrogenated cottonseed oil and palmolein was used. Kennebec potatoes having 17.8% dry matter were sliced using a 0.073 inches setting to obtain slices having an actual thickness of 0.0721 inches. The raw feed was set at 60 and the heat exchanger at 310° F. The first drum paddle was run at 3.5 seconds per revolution, and the final drum paddle at 34.7 seconds per revolution. The second and third drum paddles were stationary. The paddle assemblies were run at 6.4 seconds per revolution, submersion conveyor at 2.6 feet per minute, and take-out conveyor at 1.7 feet per minute. The rate of speed of the chip detangler was not measured, but it was noted that it was run slower than in the previous Examples. The following temperature profile was observed: (i) 287° F.; (ii) 279° F.; (iii) 261° F.; (iv) 269° F.; (v) 268° F.; and (vi) 283° F. The yield which resulted had 3.9% by weight folded chips and a few had soft centers.

EXAMPLE 14

This Example was conducted to show the convertibility of a kettle style continuous apparatus to a conventional continuous frying apparatus. An apparatus similar to the one described in Example 4 was used. Mononas potatoes having 20.8% dry matter were sliced at a setting of 0.068 inches and fed into oil 7.75 inches deep at an initial raw feed setting of 82 and at a subsequent feed setting of 78. The second and third oil inlet ports were closed such that all oil was directed through the first oil inlet. The heat exchanger was set at 352° F./342° F. (output/input temperature ratio). The drum paddles were set at 3.5 seconds per revolution, 18.2 seconds per revolution, and 18.2 seconds per revolution, respectively; the paddle assemblies at 2.9 seconds per revolution; the final drum paddle at 15.5 seconds per revolution; submersion conveyor at 4.5 feet per minute; and take-out conveyor at 3.8 feet per minute. Again, the rate of speed of the chip detangler was not measured but was noted as being slower than 1 second per revolution. No temperature profile was recorded. Good tasting chips having a water content of 1.1% by weight and oil content of 38.5% by weight were obtained.

EXAMPLE 15

This Example was conducted to demonstrate percentage of moisture of slices at various points in the frying process. Virginia Atlantic potatoes which were listed as having 19.9% dry matter (as determined by a buoyancy test) were weighed and dried in an oven at about 150° F. overnight and weighed again to determine their moisture content at about 82.2% water. The potatoes were sliced and fried in a deep-fat fryer until a point at which they resembled slices leaving the first frying zone of the present invention, i.e., the slices were floppy, showed first signs of shapeability and were observed as having bends and rippling. A moisture content of about 41.4% was determined by the drying method described above. Other slices were fried to the point that they resembled slices leaving the second frying zone of the invention, i.e., slices which were pliable and springy but still retained a shape. These slices had a moisture content of about 10.2%. Another group of slices were fried until their appearance resembled slices exiting the third frying zone of the present invention, i.e., were rigid and brittle. These slices were determined to have a moisture content of about 1.2% by weight.

CONCLUSION

While the invention has been disclosed in this patent application by reference to the details of preferred embodiments of the invention, it is to be understood that the disclosure is intended in an illustrative rather than a limiting sense, as it is contemplated that modifications may readily occur to those skilled in the art, within the spirit of the invention and the scope of the appended claims.

What is claimed is:

1. A continuous frying apparatus for making potato chips, comprising:
    an elongated vessel for containing a heated liquid frying medium, said vessel having an entrance end for receiving uncooked potato slices for immersion in the frying medium and an exit end from which the potato chips are removed after frying;
    means for supplying a heated liquid frying medium to the vessel through a first inlet port located near the entrance end thereof to define the start of a first frying zone;
    means for supplying a heated liquid frying medium to the vessel through a second inlet port located downstream of said first inlet port to define the start of a second frying zone;
    means for supplying a heated liquid frying medium to the vessel through a third inlet port located downstream of said first and second inlet ports to define the start of a third frying zone;
    means for conveying the potato slices sequentially through said first, second and third frying zones;
    means for compacting and agitating the potato slices in the second frying zone in order to achieve complete folding, without agglomeration, in at least 30% by weight of finished potato chips; and
    means for controlling the flow rate and temperature of the heated liquid frying medium supplied through each of said first, second and third inlet ports in a manner such that the temperatures of the first, second and third frying zones can be independently regulated, wherein frying of the potato slices occurs at temperatures which do not exceed about 300° F. (149° C.) in any of said first, second and third frying zones, and wherein said means for compacting and agitating potato slices are confined in space to said second frying zone.

2. A continuous frying apparatus as claimed in claim 1, wherein said means for compacting and agitating the potato slices in the second frying zone comprises at least one longitudinal paddle assembly, said longitudinal paddle assembly comprising:
    a rotatable shaft having its axis arranged parallel to the lengthwise dimension of the elongated vessel;
    a plurality of vanes affixed to said shaft and extending radially outward from the shaft axis, said vanes being arranged to dip repeatedly into the frying medium when the shaft is rotated in order to provide agitation and compaction of the potato slices in the second frying zone.

3. A continuous frying apparatus as claimed in claim 2, wherein said vanes are affixed to said shaft in a manner such that each vane is separated from the next vane both angularly about the shaft axis and axially along the length of the shaft, so that the overall arrangement of vanes along the shaft is helical.

4. A continuous frying apparatus as claimed in claim 3, wherein the angle between successive vanes is about 90°.

5. A continuous frying apparatus as claimed in claim 3, wherein each vane is adjustable in pitch with respect to the shaft axis.

6. A continuous frying apparatus as claimed in claim 3, wherein at least two such longitudinal paddle assemblies are provided in the second frying zone, and further comprising means for driving the shafts of said paddle assemblies in opposite directions so that the paddle assemblies are caused to counter-rotate, said paddle assemblies being placed sufficiently close to each other so that the vanes of one paddle assembly interdigitate with the vanes of the other paddle assembly.

7. A continuous frying apparatus as claimed in claim 6, wherein a plurality of such counter-rotating and interdigitating pairs of longitudinal paddle assemblies are provided in the second frying zone, said paddle assemblies collectively spanning substantially the entire width of the elongated vessel in the second frying zone.

8. A continuous frying apparatus as claimed in claim 6, further comprising means for adjusting the height of said longitudinal paddle assemblies in the elongated vessel.

9. A continuous frying apparatus as claimed in claim 8, wherein said adjusting means allows upstream and downstream ends of the paddle assemblies to be separately adjusted in height, whereby the inclination of the paddle assemblies can be varied.

10. A continuous frying apparatus as claimed in claim 6, further comprising at least one drum paddle for metering the potato slices through the first frying zone, said drum paddle comprising:
a rotatable shaft having its axis arranged transverse to the lengthwise dimension of the elongated vessel; and
a plurality of vanes affixed to the shaft and extending outward from the shaft axis, each vane extending substantially across the width of the vessel and being angularly spaced from the adjacent vanes about the shaft axis.

11. A continuous frying apparatus as claimed in claim 10, wherein a plurality of drum paddles are provided in the first frying zone, said plurality including an upstream drum paddle for sweeping the potato slices introduced at the entrance end of the vessel into the first frying zone and at least one downstream drum paddle for metering the potato slices through the first frying zone, and further comprising means for driving said upstream and downstream drum paddles in a manner such that the upstream drum paddle rotates at a faster speed than the downstream drum paddle.

12. A continuous frying apparatus as claimed in claim 11, wherein a plurality of downstream drum paddles are provided in the first frying zone, all of said downstream drum paddles being rotated at the same speed by said drive means.

13. A continuous frying apparatus as claimed in claim 10, further comprising a submersion conveyor for maintaining the potato slices in a submerged condition in the third frying zone, said submersion conveyor comprising an endless foraminous belt having its bottom run at or below the surface of the liquid frying medium in the vessel.

14. A continuous frying apparatus as claimed in claim 13, further comprising means for adjusting the height of the submersion conveyor in the vessel.

15. A continuous frying apparatus as claimed in claim 13, further comprising:
a take-out conveyor located downstream of the submersion conveyor for removing the completely fried potato chips from the liquid frying medium at the exit end of the vessel; and
chip detangling means for agitating the potato chips on said take-out conveyor in order to separate potato chips that have become entangled with each other.

16. A continuous frying apparatus as claimed in claim 15, wherein said chip detangling means comprising a pair of spaced-apart bars supported at their ends and positioned horizontally across the width of the take-out conveyor, and means for rotating said bars about a common horizontal axis.

17. A continuous frying apparatus for making potato chips, comprising:
an elongated vessel for containing a heated liquid frying medium, said vessel having first, second and third frying zones and an entrance end for receiving uncooked potato slices for immersion in the frying medium, an exit end from which the potato slices are removed after frying, and an interior bottom surface;
means for supplying a heated liquid frying medium to said vessel and for imparting a velocity to said frying medium in the direction from the entrance end of the vessel to the exit end in order to propel the potato slices in said direction during frying;
means for compacting and agitating potato slices during movement of the potato slices along said second frying zone of the elongated vessel, said means for compacting and agitating potato slices being confined in space to said second frying zone;
first means for adjusting the height of said compacting and agitating means with respect to the interior bottom surface of the vessel
means including an endless conveyor for maintaining the potato slices in a submerged condition in the frying medium during movement of the potato slices through the third frying zone of the elongated vessel; and
second means for adjusting the height of said endless conveyor with respect to the interior bottom surface of the vessel, to permit the endless conveyor and compacting and agitating means to be adjusted in height independently with respect to said interior bottom surface.

18. A continuous frying apparatus for making potato chips, comprising:
an elongated vessel for containing a heated liquid frying medium, said vessel having first, second and third frying zones and an entrance end for receiving uncooked potato slices for immersion in the frying medium and an exit end from which the potato slices are removed after frying;

means for supplying a heated liquid frying medium to said vessel and for imparting a velocity to said frying medium in the direction from the entrance end of the vessel to the exit end in order to propel the potato slices in said direction during frying;

means for compacting and agitating potato slices during movement of the potato slices along said second frying zone of the elongated vessel, said means for compacting and agitating potato slices being confined in space to said second frying zone;

first drive means for imparting movement to said compacting and agitating means;

means including an endless conveyor for maintaining the potato slices in a submerged condition in the heated liquid frying medium during movement of the potato slices through the third frying zone of the elongated vessel; and second drive means for imparting movement to said endless conveyor, said second drive means being independently controllable with respect to said first drive means to permit variation in the relative speeds of the and the endless conveyor.

19. A continuous frying apparatus for making potato chips, comprising:

an elongated vessel for containing a heated liquid frying medium, said vessel having an entrance nd for receiving uncooked potato slices for immersion in the frying medium and an exit end from which the potato slices are removed after frying;

means for supplying a heated liquid frying medium to said vessel and for imparting a velocity to said frying medium in the direction from the entrance end of the vessel to the exit end in order to propel the potato slices in said direction during frying;

a plurality of rotatable drum paddles for metering the movement of the potato slices in the frying medium through a first frying zone of the vessel, each of said drum paddles having its axis of rotation transverse to the lengthwise dimension of the vessel;

a plurality of rotatable longitudinal paddle assemblies for agitating and compacting the potato slices in the frying medium during movement of the potato slices through a second frying zone of the vessel, each of said longitudinal paddle assemblies having its axis of rotation parallel to the lengthwise dimension of the vessel, said paddle assemblies being confined in space to said second frying zone;

a submersion conveyor for maintaining the potato slices in submerged condition during movement of the potato slices through a third frying zone of the vessel, said submersion conveyor comprising an endless belt having its lower run at or below the surface of the frying medium; and a take-out conveyor for removing the completely fried potato chips from the liquid frying medium at the exit end of the vessel.

20. A continuous frying apparatus as claimed in claim 19, wherein said plurality of rotatable drum paddles includes an upstream drum paddle located near the entrance end of the vessel and a plurality of downstream drum paddles, and further comprising at least one metering drum paddle located between said longitudinal paddle assemblies and said submersion conveyor.

21. A continuous frying apparatus as claimed in claim 20, further comprising:

first drive means for operating said upstream drum paddle;

second drive means for operating said downstream drum paddles;

third drive means for operating said longitudinal paddle assemblies;

fourth drive means for operating said metering drum paddle;

fifth drive means for operating said submersion conveyor; and sixth drive means for operating said take-out conveyor;

said first, second, third, fourth and fifth drive means being independently controllable so as to allow the relative speeds of the upstream drum paddle, downstream drum paddles, longitudinal paddle assemblies, metering drum paddle, submersion conveyor, and take-out conveyor, respectively, to be varied.

22. A continuous frying apparatus as claimed in claim 21 further comprising:

chip detangling means for agitating the potato chips on the take-out conveyor in order to separate potato chips that have become entangled with each other said chip detangling means being operated by seventh drive means, said seventh drive means being controllable independently of said first, second, fourth, fifth and sixth drive means.

23. A continuous frying apparatus as claimed in claim 1, wherein said flow rate and temperature of heated liquid frying medium is controlled such that said potato slices are exposed to a temperature decrease of at least 20° F. (11° C.) in the temperature of the frying medium over time as the slices are conveyed through the first frying zone.

24. A continuous frying apparatus as claimed in claim 1, wherein at least 70% by weight of finished potato chips are completely folded without agglomeration.

* * * * *